United States Patent [19]

Higashitsutsumi

[11] Patent Number: 5,144,432
[45] Date of Patent: Sep. 1, 1992

[54] SYNCHRONIZING CIRCUIT FOR AN IMAGE PICKUP SYSTEM

[75] Inventor: Yoshihito Higashitsutsumi, Gifu, Japan

[73] Assignee: Sanyo Electric Co., Ltd., Moriguchi, Japan

[21] Appl. No.: 692,664

[22] Filed: Apr. 29, 1991

[30] Foreign Application Priority Data

Apr. 27, 1990 [JP] Japan ................. 2-113138
May 25, 1990 [JP] Japan ................. 2-136458
May 31, 1990 [JP] Japan ................. 2-142314

[51] Int. Cl.$^5$ .......................... H04N 5/08; H04N 5/10
[52] U.S. Cl. ............................. 358/153; 358/154; 358/158; 377/54
[58] Field of Search ........... 358/153, 154, 155, 158, 358/148; 307/269; 377/94, 78, 54

[56] References Cited

U.S. PATENT DOCUMENTS

| | | | |
|---|---|---|---|
| 4,245,251 | 1/1981 | Steckler et al. | 358/158 |
| 4,420,775 | 12/1983 | Yamazaki et al. | 360/38.1 |
| 4,476,490 | 10/1984 | Kaneko | 358/148 |
| 4,792,852 | 12/1988 | Narusawa | 358/153 |
| 5,034,815 | 7/1991 | Shibayama | 358/153 |

FOREIGN PATENT DOCUMENTS 57-131173 8/1982 Japan .................. 358/154
58-121871 7/1983 Japan .................. 358/154

*Primary Examiner*—James J. Groody
*Assistant Examiner*—Safet Metjahic
*Attorney, Agent, or Firm*—Fish & Richardson

[57] ABSTRACT

The horizontal synchronous signal and the vertical synchronous signal included in a composite synchronous signal which is output from one TV camera are separated from the composite synchronous signal. A plurality of TV cameras are controlled on the basis of the horizontal synchronous signal and the vertical synchronous signal so as to produce synchronized video signals from the plurality of TV cameras. These synchronized video signals are easy to compound. In the blanking period of the vertical synchronous signal, the rise period of the synchronous signal is ½ of the period of the vertical synchronous signal. Pulses are eliminated alternately in the blanking period by a half killer circuit including a counter and a decoder and having a simple structure, thereby generating a horizontal synchronous signal appropriate for driving the TV cameras. The counter composed of Johnson counters connected in multiple stages reduces the amount of current flowing to the counter, thereby eliminating the deleterious influence on the TV cameras.

8 Claims, 18 Drawing Sheets

SYNCHRONIZING CIRCUIT FOR AN IMAGE PICKUP SYSTEM

BACKGROUND OF THE INVENTION

1. Field of the Invention

The present invention relates to an image pickup system for transmitting a video signal including a synchronous signal from a device on the transmission side to a device on the reception side and reproducing the video signal on the reception side and, more particularly, to a synchronous signal generator for generating a synchronous signal on the transmission side and a synchronizing circuit for synchronizing the operation on the transmission side with the synchronous signal.

2. Description of the Related Art

In the case of constituting an image pickup system by a plurality of TV cameras as a monitor system by monitor cameras, it is required to synchronize the operations of the TV cameras with each other in order to enable the synchronous processing of a plurality of images. The timings for the operations of the respective cameras are generally set on the basis of the reference clocks from oscillators which are provided in the respective TV cameras. The TV cameras are operated at their own timings unless they are caused to agree with each other in advance. In order to synchronize the operations of the TV cameras, a synchronous signal common to these cameras is conventionally provided in a conventional image pick up system.

FIG. 1 shows the waveform of a composite synchronous signal CSY for obtaining the timing for the operation of a TV camera of an NTSC system.

The composite synchronous signal CSY is input to a TV camera from an external circuit and includes a horizontal synchronous signal HSY, a vertical synchronous signal VSY and an equivalent pulse EQP. These horizontal synchronous signal HSY, vertical synchronous signal VSY and equivalent pulse EQP are arranged in a predetermined order in time series. The horizontal synchronous signal HSY and the vertical synchronous signal VSY are separated from the composite synchronous signal CSY by a differentiator and an integrator. That is, the horizontal synchronous signal HSY is obtained by differentiating the composite synchronous signal CSY to detect the trailing edge of the signal and the vertical synchronous signal VSY is obtained from a change in the integrated value of composite synchronous signal CSY.

FIG. 2 is a block diagram of the structure of a synchronizing circuit for obtaining the horizontal synchronous signal HSY and the vertical synchronous signal VSY from the composite synchronous signal CSY.

A hybrid signal HYB input from an external circuit is separated into a video signal VDO for a video component and a composite synchronous signal CSY for a synchronous component by a synchronous signal separator 1, and the composite synchronous signal CSY is further input to a vertical/horizontal separator 2. The vertical/horizontal separator 2 detects the trailing edge of the signal by differentiating the composite synchronous signal CSY, thereby obtaining a horizontal synchronous signal $HSY_0$ and integrates the composite synchronous signal CSY and obtains a vertical synchronous signal VSY from a change in the integrated value.

A voltage-controlled oscillator (VCO) 3 generates a reference clock MCK in accordance with the output PDO of a later-described phase comparator 4. A counter 5 counts the reference clocks MCK. The counter is reset by the vertical synchronous signal VSY and outputs the count value to a decoder 6. The decoder 6 generates the horizontal synchronous signal HSY from the count value of the counter 5. The horizontal synchronous signal HSY is input to the phase comparator 4 together with the horizontal synchronous signal $HSY_0$ output from the vertical/horizontal separator 2. The phase comparator 4 compares the phases of the horizontal synchronous signal $HSY_0$ and the horizontal synchronous signal HSY and supplies the output PDO to the VCO 3, thereby constituting a PLL (Phase Locked Loop). In this way, the horizontal synchronous signal HSY is synchronized with the horizontal synchronous signal $HSY_0$ which is separated from the composite synchronous signal CSY.

In an image pickup system using a plurality of TV cameras, the hybrid signal HYB including a synchronous component is output from a reference TV camera and input to the respective TV cameras. In the reference camera for generating the hybrid signal HYB, a TV synchronous signal having a predetermined format is generated in the TV camera, and the scanning timing for an image sensor is set on the basis of the synchronous signal. A driving circuit for driving the image sensor of the TV camera is composed of a circuit of a synchronizing system for generating synchronous signals and a circuit of a driving system for generating an image sensor driving clock. These circuits are composed of one chip as a single integrated circuit.

However, when these circuits are composed of one chip, there are problems of beat noise generated by the difference in oscillators and the periodical noise generated by the operation of the counter provided in the circuit of the synchronizing system. Although the beat noise can be eliminated by using an oscillator in common to both circuits, it is impossible to eliminate the periodical noise because the operation of the counter itself causes the power source noise.

FIG. 3 is a block diagram of the structure of a conventional circuit of a synchronizing system. A binary counter 11 counts reference clocks CLK and operates with a horizontal scanning period H. When the count value of the counter 11 reaches a predetermined value, the output of a decoder 12 resets the binary counter 11. A second binary counter 13 counts the reference clock CLK and it is reset by the output of the decoder 12 in the same way as the binary counter 11. The output of the counter 13 is input to a decoder 14. The decoder 14 generates various synchronous signals having a period of 1H which are represented by a horizontal scanning signal HD.

If each of the binary counters 11 and 13 has a 4-bit structure, it is composed of four flip-flops, as shown in FIG. 4. In this case, the count value and the number of turning points vary as shown in the following table.

| Count value | Number of turning points |
| --- | --- |
| 0000 | — |
| 0001 | 1 |
| 0010 | 2 |
| 0011 | 1 |
| 0100 | 3 |
| 0101 | 1 |
| 0110 | 2 |
| 0111 | 1 |
| 1000 | 4 |

| Count value | Number of turning points |
| --- | --- |
|  |  |

In the binary counters 11 and 13, each of which is composed of a multi-stage flip-flop corresponding to the number of bits, since the amount of current flowing to the counters varies in accordance with the number of edges (leading edges or trailing edges), power source noise is caused in correspondence with the periodicity of the number of edges. Noise having a period of 1H is therefore produced on the driving clock and superimposed on the video output from the image sensor. The noise appears as vertical fringes on the reproduced picture.

As a countermeasure, use of a polynomial counter such as that shown in FIG. 5 is proposed.

A polynomial counter having a 4-bit structure is composed of four flip-flops 15a to 15d connected in series and a common clock CLK is supplied to the four flip-flops 15a to 15d. The exclusive OR 16 of the output of the flip-flop at the first stage and the output of the flip-flop at the fourth stage is input to the first stage and the outputs of the four flip-flops 15a to 15d are combined with each other. Since the number of the edges is not increased or reduced rapidly, the periodic noise is reduced.

In the polynomial counter, however, the number of the edges itself also increases or reduces in the range of 1 to the number of bits. For example, in an NTSC system, since the clock frequency is 14.32 MHz and it is necessary to count 910 clocks during 1H, the counter has a 10-bit structure and the number of the edges increases or reduces in the range of 1 to 10. For this reason, although the vertical fringes are not remarkable in comparison with the case using the binary counters 1 and 3, wide blur vertical fringes disadvantageously appear.

In the synchronizing circuit on the side of receiving the hybrid signal HYB, since analog circuits such as the differentiator and the integrator are mainly used in order to obtain the horizontal synchronous signal HSY and the vertical synchronous signal VSY by separating them from the composite synchronous signal CSY, it is necessary to take the delays of these analog circuits into adequate consideration. However, since the delays of these analog circuits are dependent on a temperature, it is very difficult to determine various parameters with due consideration for the delays.

In obtaining the horizontal synchronous signal HSY, in order to discriminate the equivalent pulse EQP having a period equivalent to ½ of the period of the horizontal synchronous signal HSY, a strobe pulse is set by using a counter which operates with the horizontal scanning period H in accordance with the trailing edge of the composite synchronous signal CSY, thereby eliminating the equivalent pulse EQP. However, since the counter which operates during the horizontal scanning causes beat noise, the periodical noise is superimposed on the video signal and vertical fringes are produced on the reproduced picture.

If the oscillation range of the VCO 3 is narrow, the time required for the PLL to be locked, in other words, the time required for the horizontal synchronous signal HSY to be synchronous with the horizontal synchronous signal $HSY_0$ is long, which sometimes delays the rise time of the apparatus.

SUMMARY OF THE INVENTION

Accordingly, it is an object of the present invention to eliminate the above-described problems in the related art and to stably separate the horizontal synchronous signal HSY and the vertical synchronous signal VSY from the composite synchronous signal CSY, shorten the rise time of the apparatus and easily synchronize the operation of a TV camera with the composite synchronous signal CSY without using an analog circuit.

It is another object of the present invention to suppress the superimposition of noise on a video output of an image sensor in the case of constituting a circuit of a synchronizing system and a circuit of a driving system by one chip as a single integrated circuit.

To achieve this aim, in one aspect of the present invention, there is provided a synchronizing circuit for TV cameras for synchronizing the operation of a TV camera with a predetermined timing by supplying a composite synchronous signal including a vertical synchronous component and a horizontal synchronous component to the TV camera with an image sensor for horizontal and vertical scanning mounted thereon, the synchronizing circuit comprising: an edge detector for detecting the edge, namely, the trailing edge or the leading edge of the composite synchronous signal; a half killer circuit for eliminating the output having a shorter period than the horizontal scanning period of the image sensor from the output of the edge detector and obtaining a horizontal scanning timing from the remaining output; a vertical synchronous signal separator for detecting the state before and after the trailing edge or the leading edge of the composite synchronous signal and obtaining a vertical scanning timing for the image sensor; and a counter which is reset at the vertical scanning timing and initiates the counting operation at the horizontal scanning timing; wherein the operation of the half killer circuit is suspended during the video output effective period in the vertical scanning operation in accordance with the output of the counter.

According to this synchronizing circuit, the trailing edge or the leading edge of the composite synchronous signal is detected and the half killer circuit is operated during the feedback period in the vertical scanning operation in accordance with the detected output. It is therefore possible to separate the horizontal synchronous signal and the vertical synchronous signal from the composite synchronous signal supplied to the TV camera by using a digital circuit, which has a small temperature characteristic and a stable operation, without the need for operating the counter within the video output effective period. That is, it is possible to separate the horizontal synchronous signal and the vertical synchronous signal from the composite synchronous signal by using a digital circuit having a stabler operation than an analog circuit, thereby precluding the possibility of noise superimposing on the video signal on the reproduced picture. In addition, since the identification of the field is quick and the operation of each circuit is quickly synchronized with the composite synchronous signal, it is possible to shorten the time required for the device to become operational.

In another aspect of the present invention, there is provided a synchronizing circuit for TV cameras for synchronizing the operation of a TV camera with a predetermined timing by supplying a composite synchronous signal including a vertical synchronous component and a horizontal synchronous component to the TV camera with an image sensor for horizontal and vertical scanning mounted thereon, the synchronizing circuit comprising: a counter for counting reference clocks having a predetermined period at a horizontal scanning period; a decoding circuit for obtaining a plurality of signals having a horizontal scanning period and different phases from each other from the output of the counter and compounding these signals to generate a time-sharing signal having the number of clock pulses which correspond to the number of the phases of the signals in one horizontal scanning period; a detector for detecting the trailing edge or the leading edge of the composite synchronous signal; a half killer circuit which is started in accordance with the output of the detector and which eliminates the output having a shorter period than the horizontal scanning period from the output of the detector as half killing operation during the period in which an approximate number of clock pulses of the time-sharing signal are counted so as to obtain a horizontal scanning timing; and a vertical synchronous signal separator for detecting a change before and after the trailing edge or the leading edge of the composite synchronous signal so as to obtain a vertical scanning timing.

According to this synchronizing circuit, the horizontal scanning period is divided into a plurality of portions by the time-sharing signal for generating a plurality of clock pulses during the horizontal scanning period, and the half killing period is set at a period from the trailing edge or the leading edge of the composite synchronous signal over to an appropriate number of portions of the divided period. The equivalent pulse having a shorter period than the horizontal scanning period is therefore eliminated and a horizontal synchronous signal is obtained, and it is possible to synchronize the operation of the TV camera with the composite synchronous signal by synchronizing a signal having the horizontal scanning period in the decoding circuit with the horizontal synchronous signal.

In this way, it is possible to separate the horizontal synchronous signal from the composite synchronous signal by the half killing operation of a circuit with a simple structure and, hence, to expect a stable operation.

If the half killer pulse is latched at each timing of the vertical synchronous signal, it is possible to obtain a field identification signal which is inverted in each field, so that the field is quickly identified and the operation of each circuit is quickly synchronized with the composite synchronous signal, thereby shortening the time required for rising the device.

In still another aspect of the present invention, there is provided a counter comprising a plurality of loop shift registers connected with each other each of which is composed of a plurality of flip-flops connected in series and operated in accordance with a common clock. The output of the flip-flop at the final stage in each shift register is input to the flip-flop at the first stage, thereby constituting a loop. When the edge of the data in the shift register reaches a predetermined position, a carrying signal is generated. The shift register at the next stage receives the carrying signal and initiates the counting operation. A common clock having a predetermined period is supplied to each of the shift registers and the operation of each sift register is synchronized with the clock.

According to this counter, the edge of each bit in each shift register is constantly 1, and the number of the edges of the counter as a whole is equivalent to at most the number of the shift registers when the shift registers at the next stages are operated in accordance with the carrying signals.

It is therefore possible to greatly reduce the power source noise due to the operation of the counter provided in the synchronizing circuit, thereby realizing a counter having a low degree of periodic noise. Since the Johnson counters connected in the multiple stages as the shift registers are operated by a common clock, the counting operation of the counter in the circuit never becomes asynchronous. In other words, the output of the counter is synchronized with the reference clock.

In the case of constituting a circuit of a synchronizing system and a circuit of a driving system by one chip using the low-noise counter, periodic noise is not superimposed on the driving clock, thereby enabling the stable driving of the image sensor. Thus, the periodic noise is not mixed with the video output of the image sensor and it is possible to obtain a reproduced picture having a high picture quality.

The above and other objects, features and advantages of the present invention will become clear from the following description of the preferred embodiment thereof, taken in conjunction with the accompanying drawings.

DESCRIPTION OF THE PREFERRED EMBODIMENTS

System Structure

Figure 1:
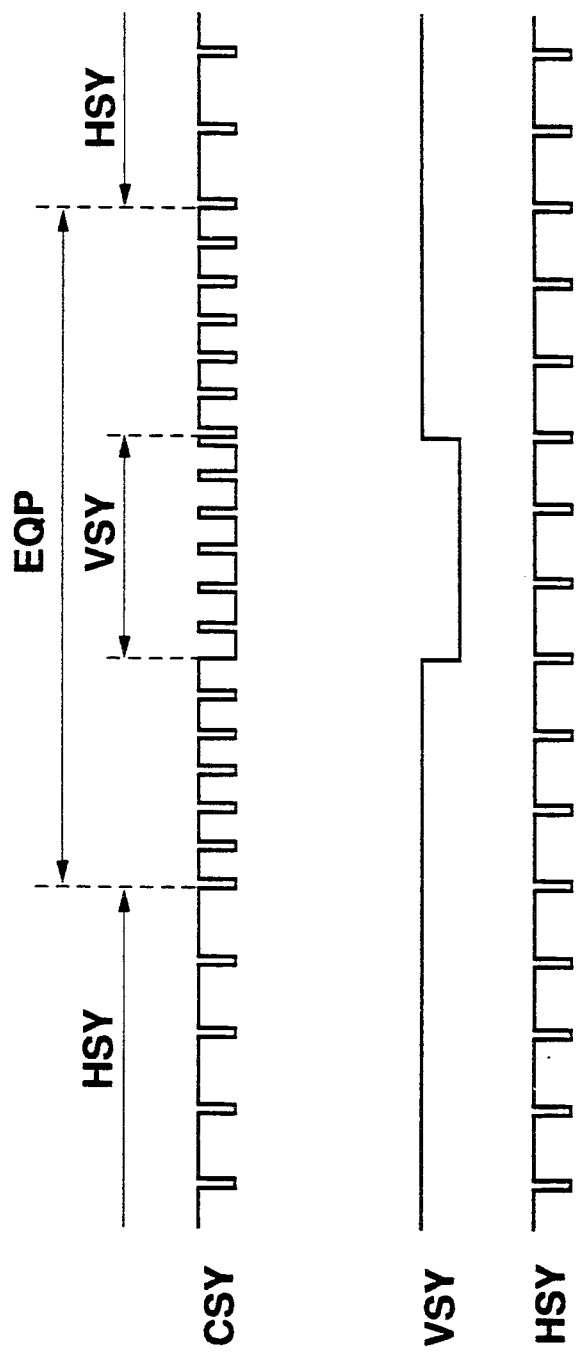
FIG. 1 shows the waveform of a composite synchronous signal.
Figure 2:
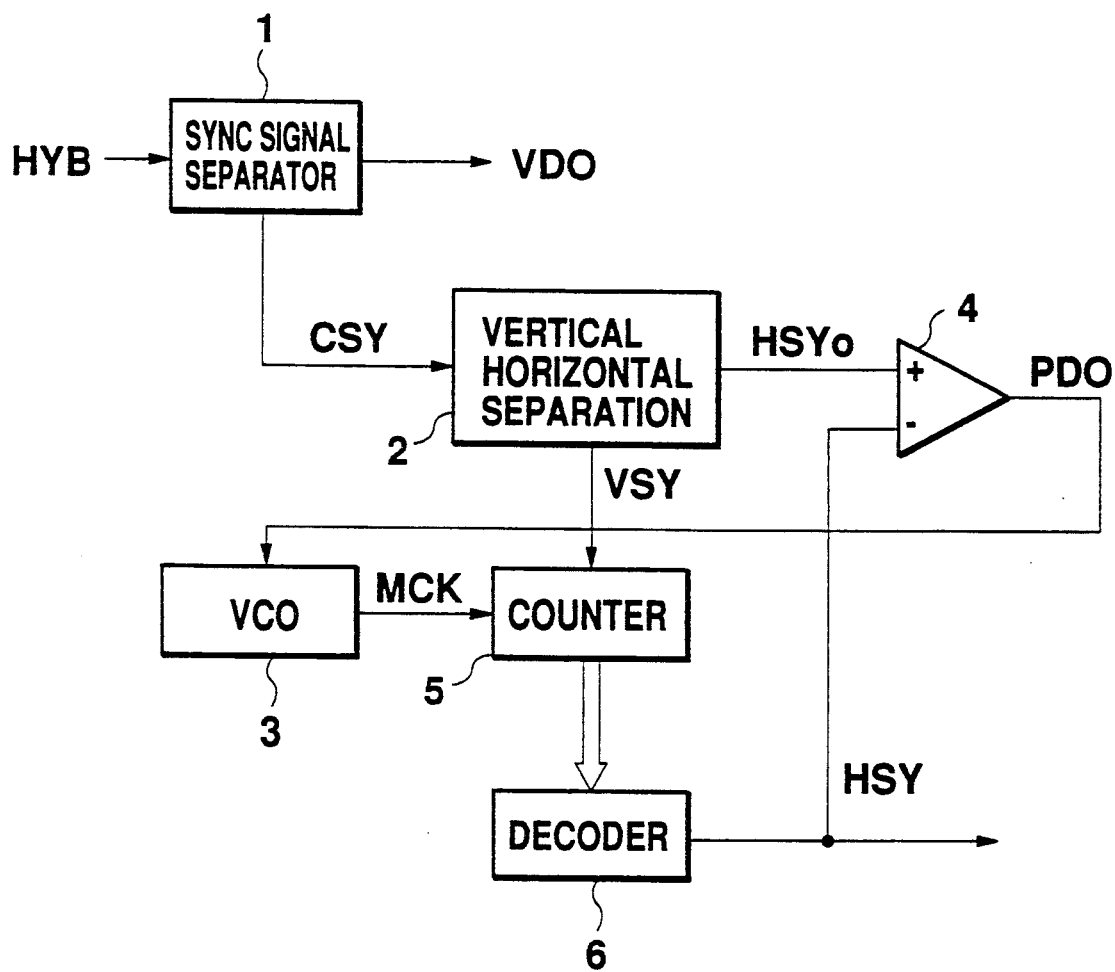
FIG. 2 is a block diagram of a conventional synchronizing circuit.
Figure 3:
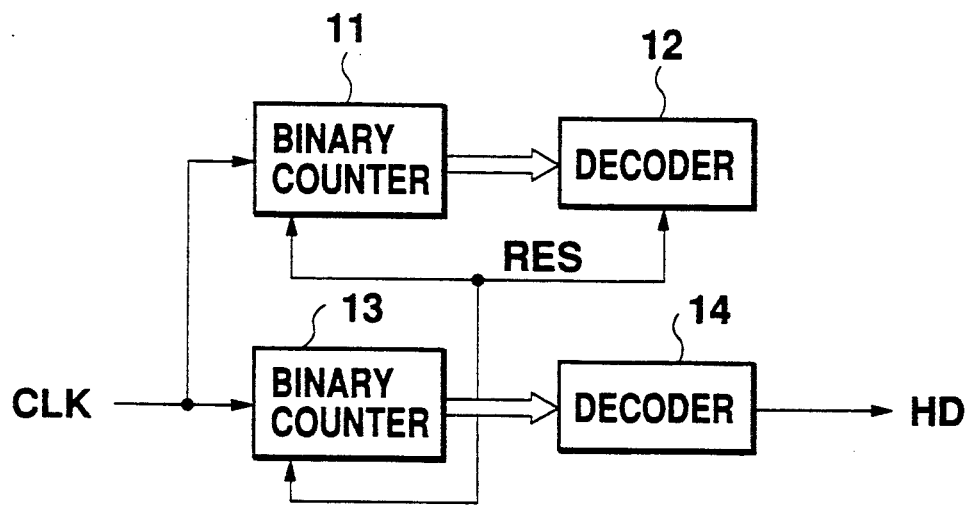
FIG. 3 is a block diagram of a circuit of a conventional synchronizing system of an image pickup device.
Figure 4:
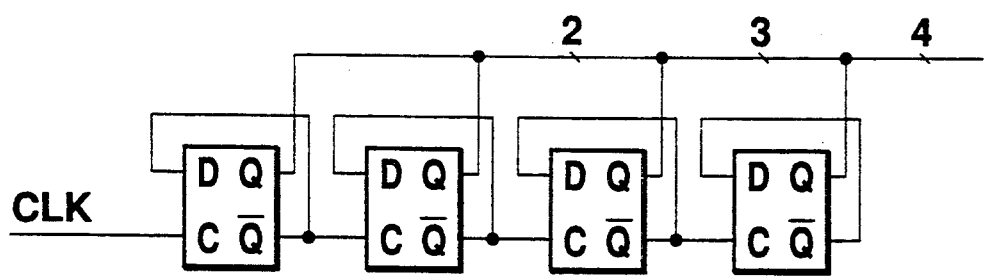
FIG. 4 is a block diagram of a binary counter.
Figure 5:
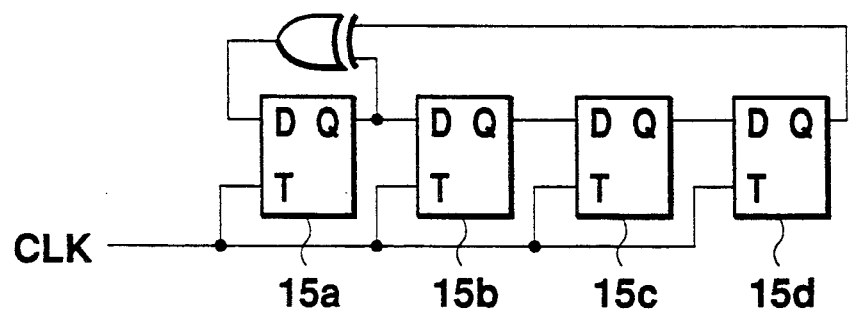
FIG. 5 is a block diagram of a polynomial counter.
Figure 6:
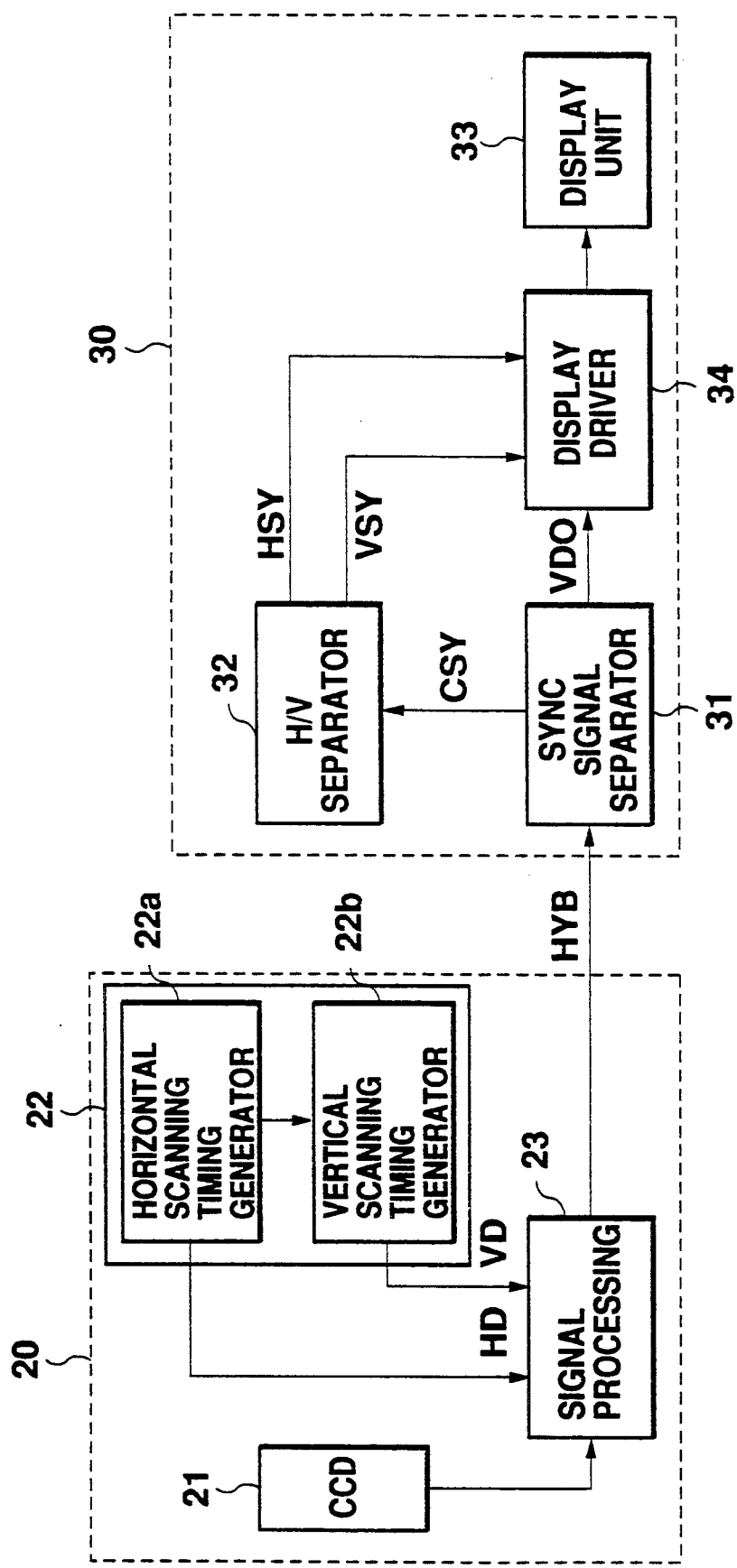
FIG. 6 is a block diagram of the structure of a system having a camera and a monitor.

FIG. 6 is a block diagram of the structure of an image pickup system for transmitting an image obtained by a camera 20 to a monitor 30 in the form of a hybrid signal HYB and reproducing the image by the monitor 30.

The camera 20 is provided with a CCD solid-state image sensor 21 for receiving the image of an object, a synchronous signal generator 22 for setting the scanning timing for the CCD 20 and a signal processor 23 for subjecting the output signal of the CCD 21 to a predetermined processing. The camera 20 outputs a hybrid signal HYB including a video component and a synchronous component to the monitor 30. The monitor 30 for receiving the hybrid signal HYB is provided with a synchronous signal separator 31 for taking out the synchronous component from the hybrid signal HYB, a horizontal/vertical separator 32 for separating a horizontal component and a vertical component from a composite synchronous signal CSY and a display driver 34 for driving a display unit 33 such as a cathode ray tube. The monitor 30 displays the video obtained by the camera 30 on the display unit 33.

The synchronous signal generator 22 for generating synchronous signals is composed of a horizontal scanning timing generator 22a which is operated with a horizontal scanning period of the CCD 21 and a vertical scanning timing generator 22b which is operated with a vertical scanning period of the CCD 21 and supplies a timing signal having a horizontal scanning period which is represented by a horizontal driving signal HD and a timing signal having a vertical scanning period which is represented by a vertical driving signal VD to the signal processor 23 and a CCD driving circuit (not shown). These timing signal generators 22a, 22b have counters for counting reference clocks and the horizontal driving signals HD, respectively, and decoders for decoding the outputs of the respective counters. These counters are reset with a horizontal scanning period and a vertical scanning period, respectively. The frequency of the reference clock having a high frequency is divided with a predetermined period so as to generate various timing signals. The signal processor 23 subjects the output of the CCD 21 to processings such as sample holding and the correction of the level, and further superimposes a composite synchronous signal CSY including a horizontal synchronous component and the vertical synchronous component on the output of the CCD 21, thereby generating the hybrid signal HYB.

The synchronous signal separator 31 of the monitor 30 takes out only the synchronous signal component as the composite synchronous signal CSY by eliminating the signal of a higher level than the level of the pulse of the synchronous signal from the hybrid signal HYB and supplies the composite synchronous signal CSY to the horizontal/vertical separator 32. The horizontal/vertical separator 32 separates a horizontal synchronous signal HSY and a vertical synchronous signal VSY from the composite synchronous signal CSY including a horizontal component and a vertical component and supplies these synchronous signals to the display driver 34. The display driver 34 drives the display unit 33 such as a cathode ray tube and a liquid crystal panel in accordance with these synchronous signals and reproduces the image obtained by the CCD 21 of the camera 20 on the display unit 33.

The counters adopted in the synchronous signal generator 22 of the camera 20 are unlikely to cause periodic noise, as will be described later, so that the probability of the superimposition of periodic noise on the video component of the hybrid signal HYB is lessened.

As the horizontal/vertical separator 32 of the monitor 30, a circuit having few analog circuit portions is used, as will be described later, so that the change in the characteristics due to a temperature change and the like is suppressed.

Figure 7:
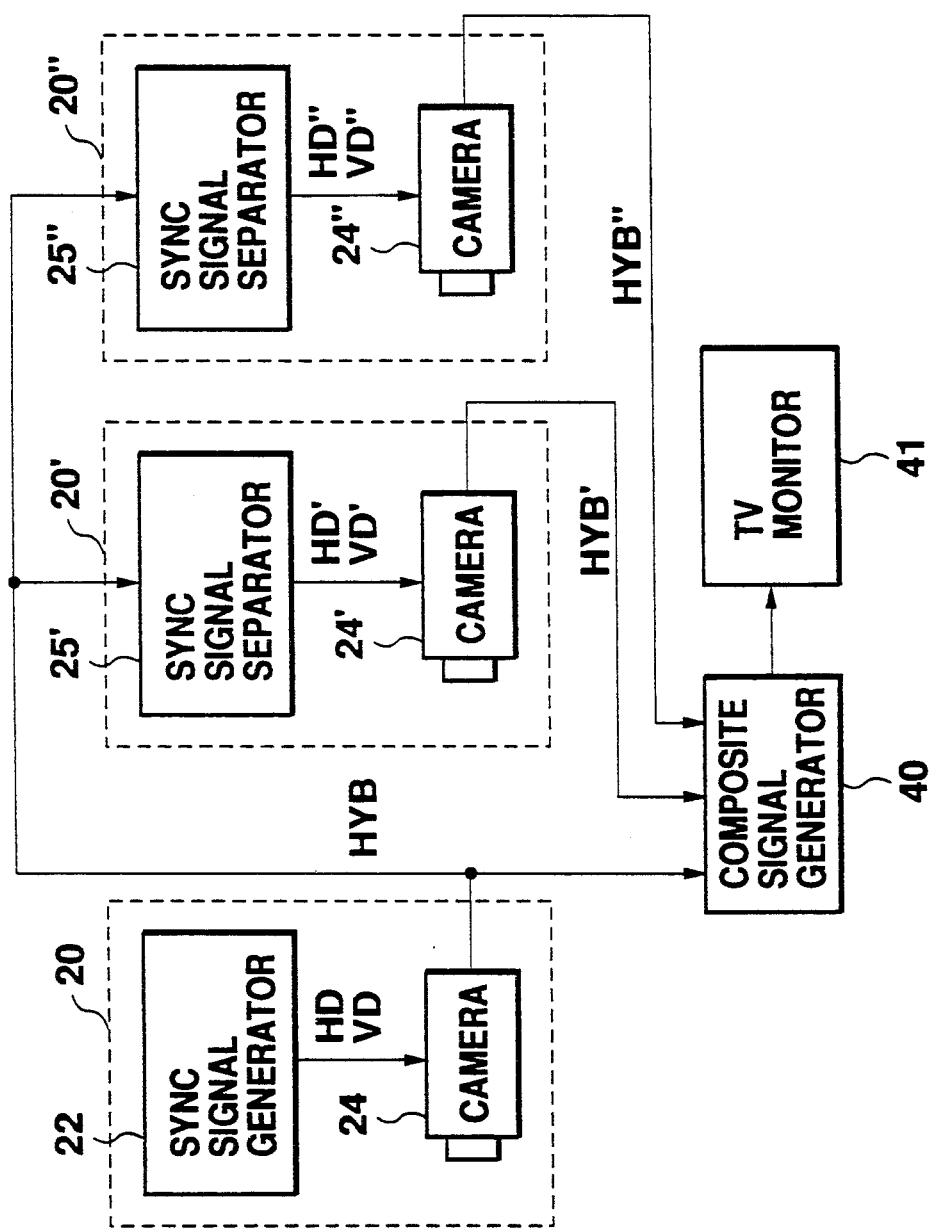
FIG. 7 shows the structure of a system having a plurality of cameras.

FIG. 7 shows a system in which the hybrid signal HYB from the reference TV camera 20 is supplied to other TV cameras 20', 20'' so as to drive these three TV cameras 20, 20', 20'' in accordance with the same synchronous signal. The hybrid signals HYB, HYB' and HYB'' obtained from these three cameras 20, 20' and 20'' are therefore based on the same synchronous signal, and they are easily compounded by a composite signal generator 40. It is therefore possible to compound three hybrid signals HYB, HYB' and HYB'' into one hybrid signal and display it on a TV monitor 41.

If the video components from the TV cameras 20, 20' and 20'' are superimposed on only a part of the synchronous signal at different positions from each other, it is possible to display the three images from the respective TV cameras 20, 20' and 20'' at three different positions on the TV monitor 41 merely by superimposing the three hybrid signals HYB, HYB' and HYB''.

A camera body 24 of the reference TV camera 20 is driven by the synchronous signal generator 22 which is unlikely to produce periodic noise. In the TV cameras 20' and 20'', camera bodies 24' and 24'' are driven in accordance with synchronous signals HSY', VSY', HSY'' and VSY'' output from synchronous signal separators 25' and 25'' which have few analog circuits.

First Embodiment

Figure 8:
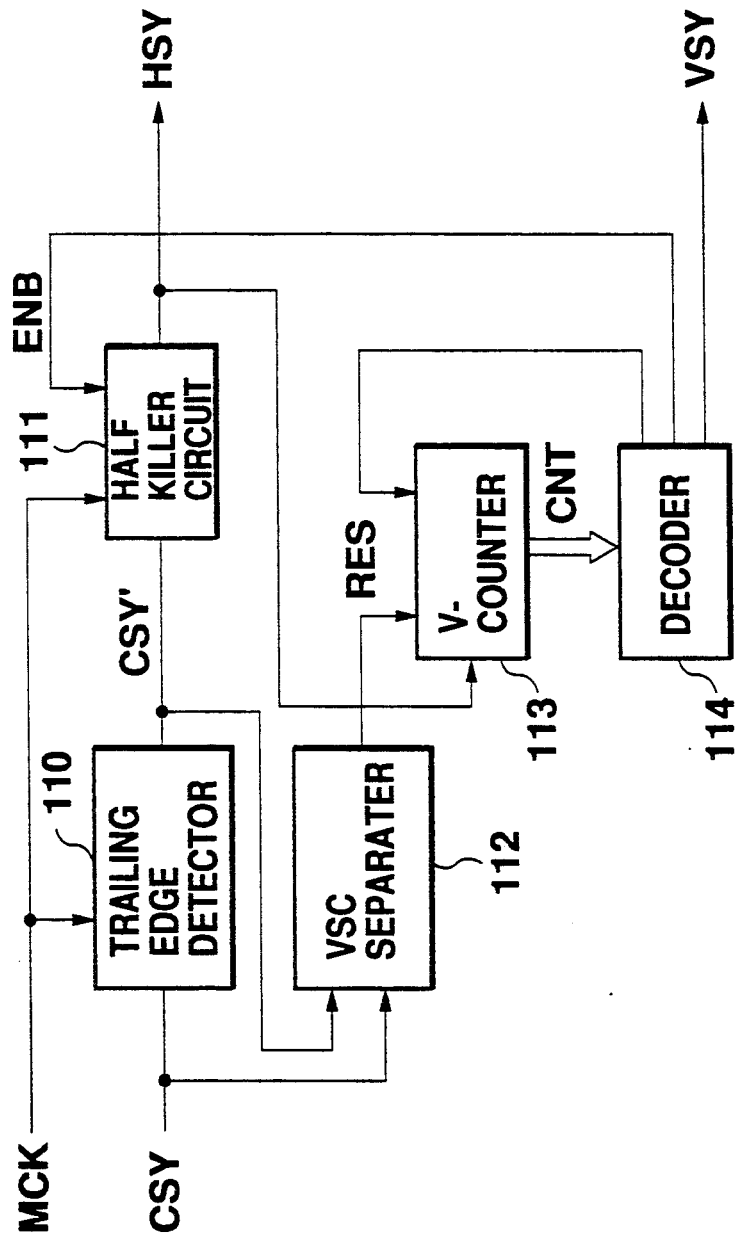
FIG. 8 is a block diagram of a first embodiment of a synchronizing circuit according to the present invention.
Figure 9:
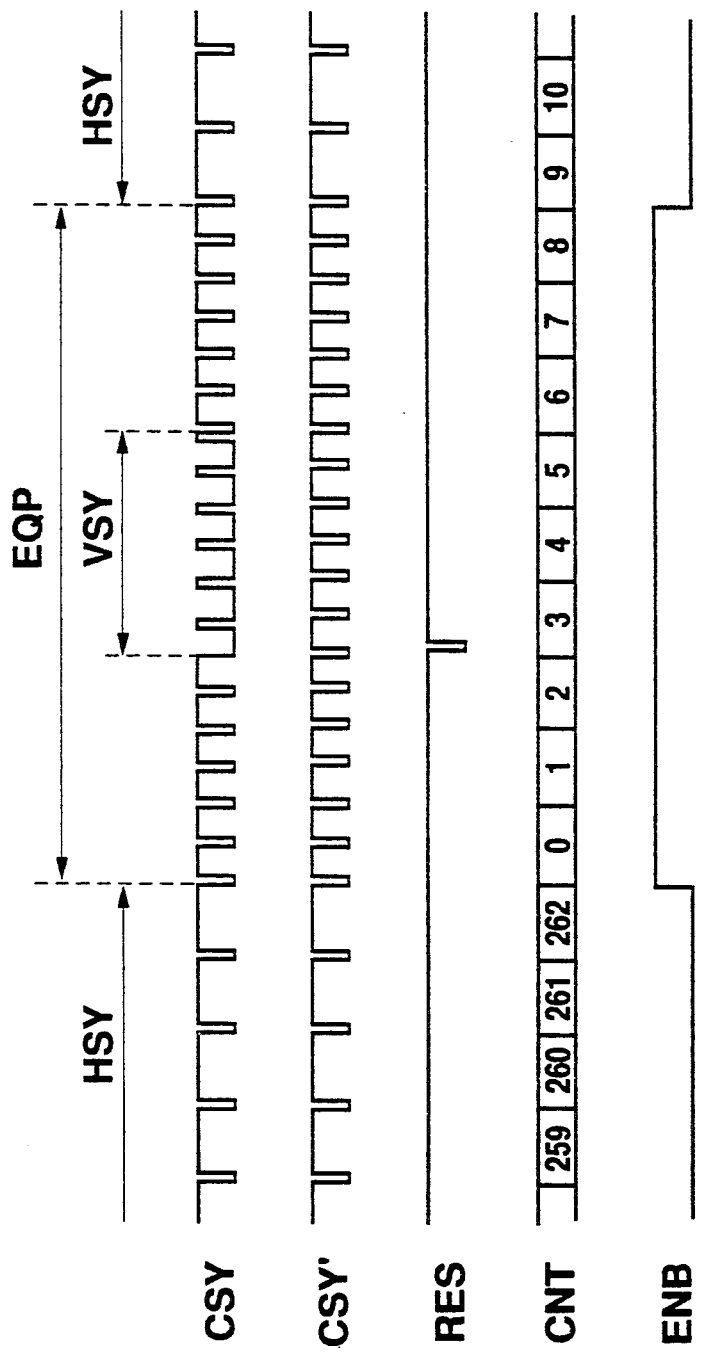
FIG. 9 is a timing chart of the operation of the first embodiment shown in FIG. 9.

FIG. 8 is a block diagram of the structure of a first embodiment of a synchronizing circuit according to the present invention and FIG. 9 is a timing chart of the operation thereof. In this embodiment, the NTSC system is adopted.

The composite synchronous signal CSY including the horizontal synchronous signal HSY, the vertical synchronous signal VSY and the equivalent pulse EQP is input to a fall detector 110 after the separation of the video signal therefrom. The fall detector 110 detects the trailing edge of the composite synchronous signal CSY on the basis of the reference clock MCK and the output of the fall detector 110 is supplied to a half killer circuit 111. The half killer circuit 111 counts with a horizontal scanning period in accordance with the reference clock MCK, and eliminates the signal having a period equivalent to ½ of the horizontal scanning period, namely, the equivalent pulse EQP so as to output the horizontal synchronous signal HSY.

If the reference clock MCK has a frequency of 14 MHz, one horizontal scanning period is 908 clocks in the PAL system and 910 clocks in the NTSC system.

A vertical synchronous signal separator 112 separates the vertical synchronous component represented by VSY from the output CSY' of the fall detector 110. The vertical synchronous signal separator 112 then detects the timing of the trailing edge of VSY and generates a reset signal RES.

The reset signal RES is used as the reset signal for a counter 113 for generating the vertical synchronous signal VSY.

The vertical synchronous signal separator 112 is so constructed as to sample the composite synchronous signal CSY in accordance with a strobe signal which is delayed by a predetermined time in relation to the trailing edge of the composite synchronous signal CSY. The timing for the leading edge of the composite synchronous signal CSY changes in the blanking period (the period in which the signal is "L") of the vertical synchronous signal VSY. Therefore, if the composite synchronous signal CSY is sampled at a timing delayed by a predetermined period which is shorter than the period in which the vertical synchronous signal VSY is "L" and the composite synchronous signal CSY is continuously "L", it is possible to obtain the vertical synchronous signal VSY from the composite synchronous signal CSY.

The counter 113 is reset by the reset signal RES, counts the horizontal synchronous signals HSY and supplies the output CNT to a decoder 114. In this embodiment, [3] is set at the counter 113 at a timing of the reset signal RES, and the counter 113 is so designed that when the output CNT of the counter 113 reaches [262], the counter 113 is reset.

The decoder 114 generates the vertical synchronous signal VSY which outputs [L] only while the count values CNT are 3, 4 and 5, falls at timing of the reset signal RES and rises after a predetermined time. The decoder 114 also generates an enable signal ENB which outputs [H] only while the count values CNT are 0 to 8 and enables the operation of the half killer circuit 111 only in the blanking period of the vertical synchronous signal VSY scanning operation. The half killer circuit 111, which operates in accordance with the enable signal ENB, operates in the blanking period of the vertical scanning operation in which the equivalent pulse EQP is existent. In the NTSC system, the enable signal ENB is set so that the half killer circuit 111 operates for 9H periods in which the equivalent pulse EQP is existent.

Since the counting operation of the half killer circuit 111 is limited to the blanking period of the vertical scanning operation in this way, power noise due to the counting operation is not produced during the video output effective period.

Figure 10:
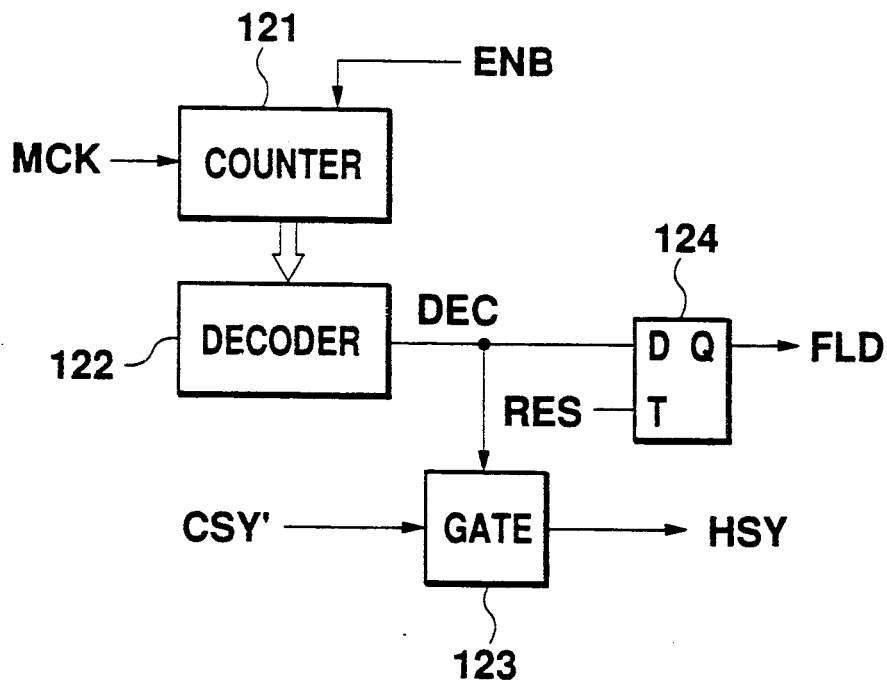
FIG. 10 is a block diagram of the structure of a half killer circuit.
Figure 11:
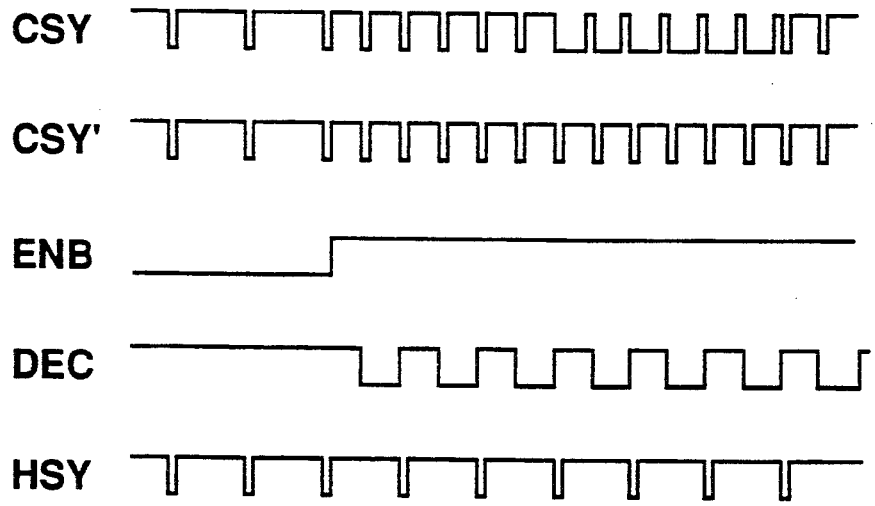
FIG. 11 is a timing chart of the operation of the half killer circuit shown in FIG. 10.

FIG. 10 is a block diagram of the structure of the half killer circuit 111 and FIG. 11 is a timing chart of the operation thereof.

The half killer circuit 111 is composed of a counter 121, a decoder 122 and a gate circuit 123 and so constructed as to supply the output of the counter 121 which counts the reference clocks MCK while the enable signal ENB is [H] to the decoder 122 and open or close the gate circuit 123 in accordance with the output DEC of the decoder 122. The decoder 122 generates the output DEC which inverts at intervals of a period equivalent to ½ of the horizontal scanning period from the output of the counter 121 which operates with the horizontal scanning period. The output DEC is supplied to the gate circuit 123. Therefore, the equivalent pulse EQP having the period equivalent to ½ of the period of the horizontal synchronous signal HSY is eliminated at every other period and agrees with the horizontal synchronous signal HSY.

In the NTSC system, there is a difference of half the horizontal scanning period between the horizontal synchronous signal HSY and the vertical synchronous signal VSY in an even field and those in an odd field. It is therefore possible to identify the field by latching the output DEC of the decoder 122 which inverts at intervals of ½ of the horizontal scanning period at the timing of the reset signal RES. The decoder 122 is connected to a flip-flop 124 which receives the output DEC of the decoder 122 at the input D and the reset signal RES is supplied from the vertical/horizontal separator 112 to the input T of the flip-flop 124, thereby obtaining a field identification signal FLD from the output Q of the flip-flop 124. Since the identification signal FLD is obtained directly from the composite synchronous signal CSY in this way, it is possible to identify the filed more quickly than in the case of identifying the field by comparing the phases of the horizontal synchronous signal HSY and the vertical synchronous signal VSY. As a result, each circuit which operates after identifying the field quickly gets ready for operation in synchronism with the composite synchronous signal CSY, so that the time required for the initialize period of the device is shortened.

Second Embodiment

A second embodiment of the present invention will now be explained with reference to FIGS. 12 to 15.

Figure 12:
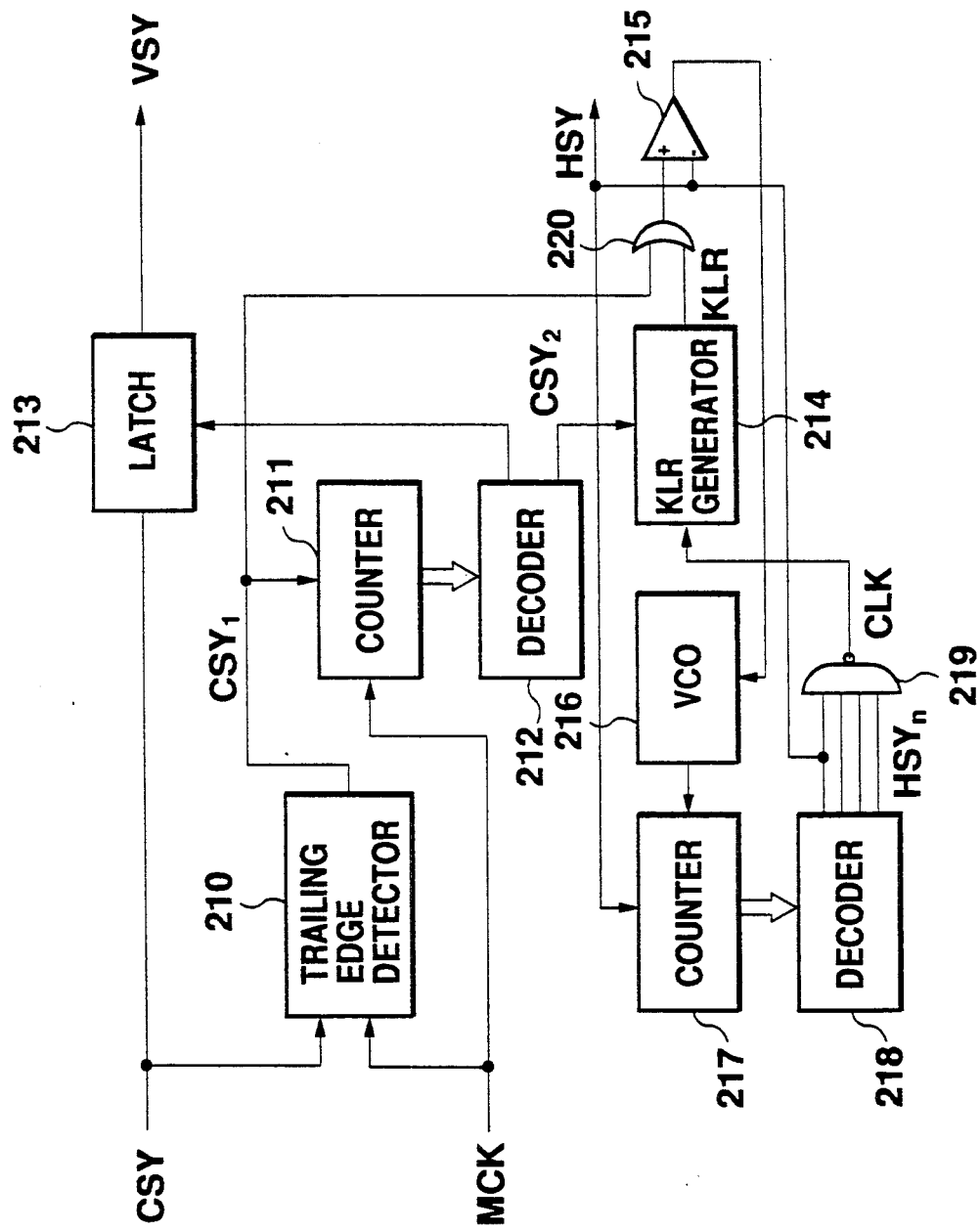
FIG. 12 is a block diagram of a second embodiment of a synchronizing circuit according to the present invention.
Figure 13:
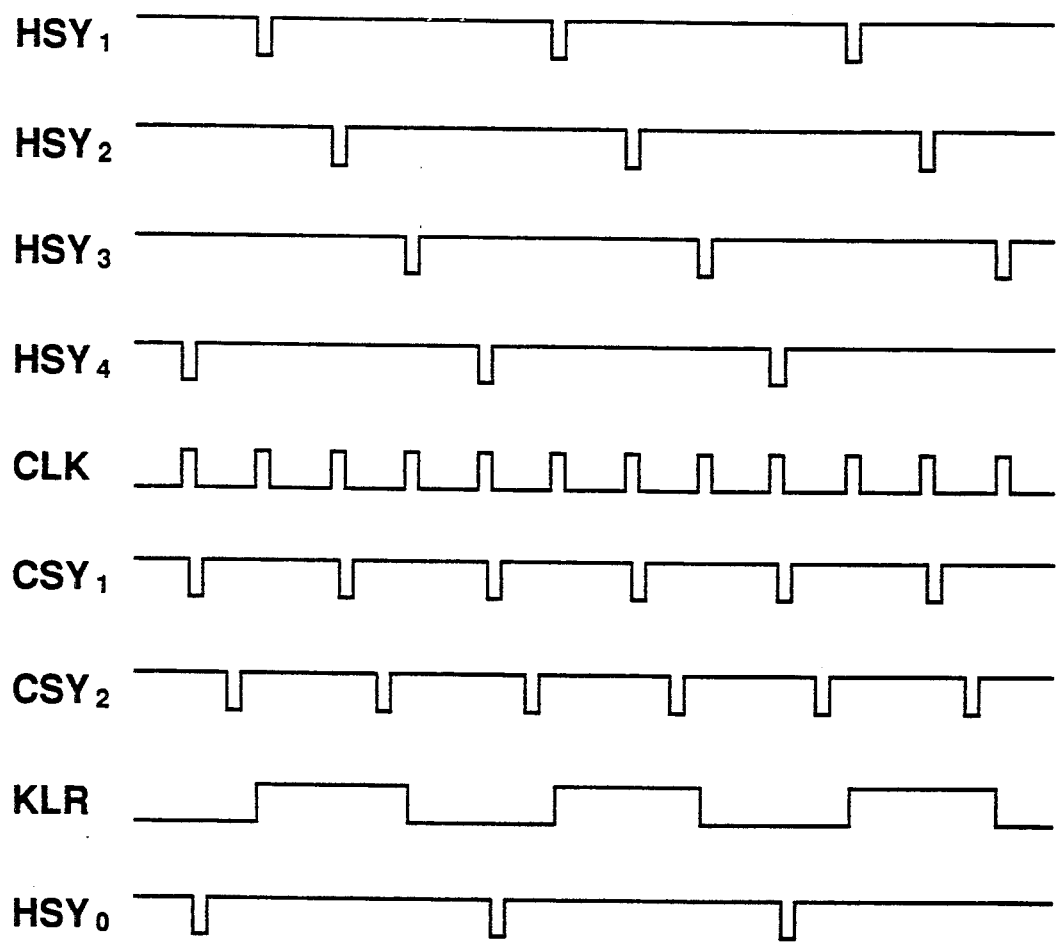
FIG. 13 is a timing chart of the operation of the second embodiment shown in FIG. 12.

FIG. 12 is a block diagram of the structure of a second embodiment of a synchronizing circuit according to the present invention, and FIG. 13 is a timing chart of the operation thereof.

A trailing edge detector 210 detects the trailing edge of the composite synchronous signal CSY in accordance with the reference clock MCK and outputs a detection signal $CSY_1$ which becomes [L] after the detection of the trailing edge in the period corresponding to the pulse width of the reference clock MCK. The detection signal $CSY_1$ is used as a resetting signal of a counter 211 for counting the reference clocks MCK. The counter 211 is reset with the horizontal scanning period and repeats the counting operation. The counting period is synchronized with the composite synchronous signal CSY. A decoder 212 is so constructed as to output [H] when the output of the counter 211 is a predetermined value and supplies a detection signal $CSY_2$ which is delayed by a predetermined period in relation to the trailing edge of the composite synchronous signal CSY and a latch pulse to a later-described half killer pulse generator 214 and a latch circuit 213, respectively. The detection signal $CSY_2$ is delayed by about 1/10 of the horizontal scanning period in relation to the detection signal $CSY_1$ and determines the timing for starting the half killer pulse generator 214. The latch circuit 213 separates the vertical synchronous signal VSY from the composite synchronous signal CSY and detects the trailing edge of the vertical synchronous signal VSY by latching the composite synchronous signal CSY at a timing a predetermined time behind the trailing edge of the composite synchronous signal CSY.

A counter 217 for counting in accordance with the output of a VCO 216 is reset by the horizontal synchronous signal HSY for initiating the counting operation and supplies the count value to a decoder 218. The decoder 218 decodes the count value of the counter 217 and outputs horizontal synchronous signals $HSY_1$ to $HSY_4$ having different phases. In other words, when the count value becomes predetermined four predetermined values, the four signal lines are set at [L]. These phase differences are set at a substantially equal value, and the horizontal synchronous signals $HSY_1$ to $HSY_4$ are compounded by a NAND gate 219 to generate a time-sharing clock CLK for dividing the horizontal scanning period into four portions.

The half killer pulse generator 214 is started in accordance with the detection signal $CSY_2$ and generates a half killer pulse KLR which executes half killing operation in a predetermined period in accordance with the clock pulse of the time-sharing clock CLK. The half killer pulse KLR is so designed as to rise at the timing of the leading edge of the time-sharing clock CLK subsequent to the leading edge of the detection signal $CSY_2$ and to fall at a timing of the leading edge of the time-sharing clock CLK subsequent to the reception of a predetermined number (one in this embodiment) of clock pulses of the time-sharing clock K. The half killer pulse KLR and the detection signal $CSY_1$ are compounded by an OR gate 220, whereby the [L] pulse of the detection signal $CSY_1$ is eliminated at every other period, namely, the half killer pulse KLR executes half killing operation. In this way, a signal having a shorter period than the horizontal scanning period, namely, the equivalent pulse EQP is eliminated from the detection signal $CSY_1$, and a horizontal synchronous signal $HSY_0$ is obtained.

The phase of the horizontal synchronous signal $HSY_0$ separated from the composite synchronous signal CSY is compared with the phase of the hs1 which is output from the decoder 218 by a phase comparator 215 and the output is supplied to the VCO 216, thereby constituting a PLL. The operation of the counter 217, namely, the horizontal synchronous signals $HSY_1$ to $HSY_4$ are therefore synchronized with the composite synchronous signal CSY.

Figure 14:
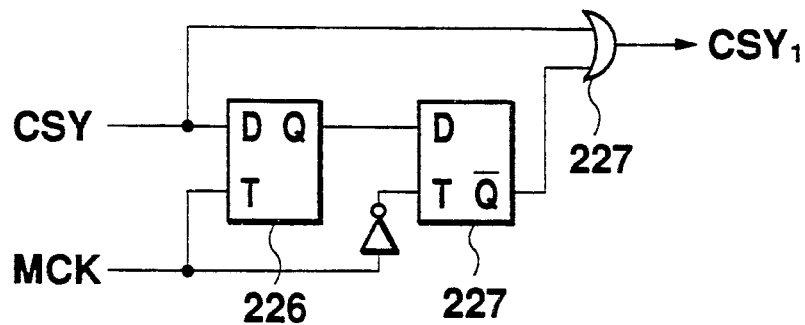
FIG. 14 shows the structure of a fall detector.

In this embodiment, the horizontal synchronous signal $HSY_1$ is output as the horizontal synchronous signal HSY. Since $HSY_1$ and $HSY_0$ are fundamentally the same signal, either may be output, but $HSY_1$ is preferable because the pulse width thereof is controllable. FIG. 14 shows the structure of the fall detector 210.

A flip-flop 226 receives the composite synchronous signal CSY at the input D and supplies the output Q to the input D of a flip-flop 227 at a timing in accordance with the reference clock MCK. The flip-flop 227 inputs the output $\overline{Q}$ to an OR gate 228 together with the composite synchronous signal CSY at a timing in accordance with the inverted signal of the reference clock MCK. The detection signal $CSY_1$ is output from the OR gate 228. Accordingly, when the composite synchronous signal CSY falls, the OR gate 228 is inverted and the detection signal $CSY_1$ falls. At the subsequent leading edge of the reference clock MCK, the output Q of the flip-flop 226 rises and at the subsequent trailing edge of the reference clock MCK, the output $\overline{Q}$ of the flip-flop 227 rises. The OR gate 228 is then inverted and the detection signal $CSY_1$ rises.

Figure 15:
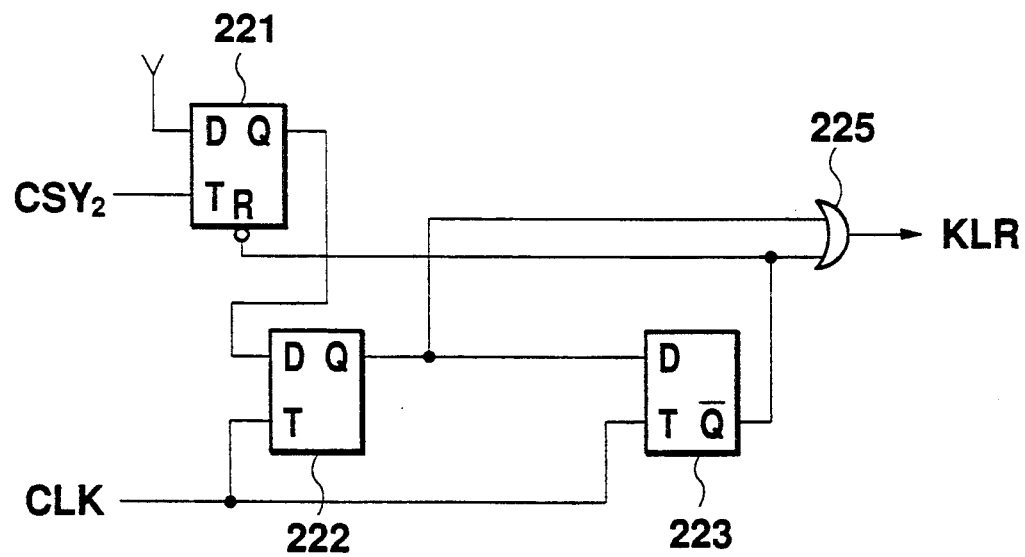
FIG. 15 shows the structure of a half killer pulse generator.

FIG. 15 shows an example of the half killer pulse generator 214 in the state in which the time-sharing clock CLK divides the horizontal scanning period into four portions.

The supply potential is applied to the input D of a flip-flop 221, which supplies the output Q to a flip-flop in accordance with the detection signal $CSY_2$. The flip-flop 222 supplies the output Q to the input D of a flip-flop 223 and an OR gate 225 in accordance with the time-sharing clock CLK. The flip-flop 223 shifts the output Q of the flip-flop 222 in accordance with the time-sharing clock CLK and supplies the output $\overline{Q}$ of the flip-flop 223 to the OR gate 225.

Alternately, the half killer pulse generator 214 may be constituted by a counter having an appropriate number of bits for counting in accordance with the time-sharing clock CLK.

The half killing operation will now be explained.

FIG. 13 is a timing chart of the half killing operation of a half killer circuit having a four-phase structure such as that shown in FIG. 15.

The horizontal synchronous signals $HSY_1$ to $HSY_4$ having four phases are generated by the decoder 218 for decoding the output of the counter 217 and they have a substantially equal phase difference between each other. In the case of the NTSC system, for example, since the counter 217 counts clocks in one horizontal scanning period, the decoder is so constructed as to receive the output of the counter 217 at any time that the counter 217 outputs 0, 228, or 683. The time-sharing clock CLK which is generated by the NAND gate 219 generates four clock pulses in one horizontal scanning period so as to divide one horizontal scanning period into four portions.

When the output Q of the flip-flop 221 rises at the leading edge of the detection signal $CSY_2$ a predetermined time behind the detection signal $CSY_1$, the supply potential is input to the input D of the flip-flop 222 and the output Q of the flip-flop 222 rises at the subsequent leading edge of the time-sharing clock CLK. Therefore, the half killer pulse KLR rises at the leading edge of the time-sharing clock CLK subsequent to the leading edge of the detection signal $CSY_2$.

At the second leading edge of the time-sharing clock CLK, the output Q of the flip-flop 223 rises, the output $\overline{Q}$ thereof falls and the output Q of the flip-flop 221 fall.

In this state, when the output Q of the flip-flop 222 falls at the third leading edge of the time-sharing clock CLK, the OR gate 225 is inverted and the half killer pulse KLR falls. At the next leading edge of the CLK, the output Q of the flip-flop 223 rises. In this way, the half killer pulse KLR sets the half killing period at the two time-sharing clock periods after the leading edge of the detection signal $CSY_2$.

By obtaining the OR of the half killer pulse kLR and the detection signal $CSY_1$, it is possible to eliminate the equivalent pulse EQP having a shorter period than the period of the horizontal synchronous signal HSY and to obtain the horizontal synchronous signal $HSY_0$. The VCO 216 constituting the PLL is so controlled as to be synchronized with the composite synchronous signal CSY by comparing the phase of the horizontal synchronous signal $HSY_0$ with the phase of one of the horizontal synchronous signals $HSY_1$ to $HSY_4$.

It is in order to prevent an error in the half killing operation that the detection signal $CSY_2$ which is delayed in relation to the composite synchronous signal CSY is used in determining the timing for starting the half killer pulse generator 214. In this way, the error in the period caused until the horizontal synchronous signals $HSY_1$ to $HSY_4$ are synchronized with the composite synchronous signal CSY is compensated. For example, when the period of any of the horizontal synchronous signals $HSY_1$ to $HSY_4$ is shorter than the intrinsic horizontal scanning period, if the leading edge of the detection signal $CSY_1$ is input immediately before the trailing edge of the time-sharing clock CLK, there is a fear of the half killer pulse KLR falling before the trailing edge of the detection signal $CSY_1$, thereby making it impossible to eliminate the equivalent pulse EQP. To prevent this, the timing for starting the half killing operation is set in accordance with the detection signal $CSY_2$ which is delayed in relation to the composite synchronous signal CSY.

That is, if the timing for starting the half killing operation is set at a timing delayed in relation to the composite synchronous signal CSY, since the timing for starting the half killing operation is delayed by 1 clock of the time-sharing clock CLK when the leading edge of the detection signal $CSY_1$ is input immediately before the trailing edge of the time-sharing clock CLK, the half killer pulse KLR never falls before the detection signal $CSY_1$.

It is in the case in which a horizontal synchronous signals $HSY_n$ has four to five phases that the detection signal $CSY_2$ which is delayed in relation to the composite synchronous signal CSY is used in determining the timing for starting the half killing operation. In a not less than six-phase structure, the detection signal $CSY_1$ without the need for delay may be used in determining the timing for starting the half killing operation.

Third Embodiment

A third embodiment of the present invention will now be explained with reference to FIGS. 16 to 19.

Figure 16:
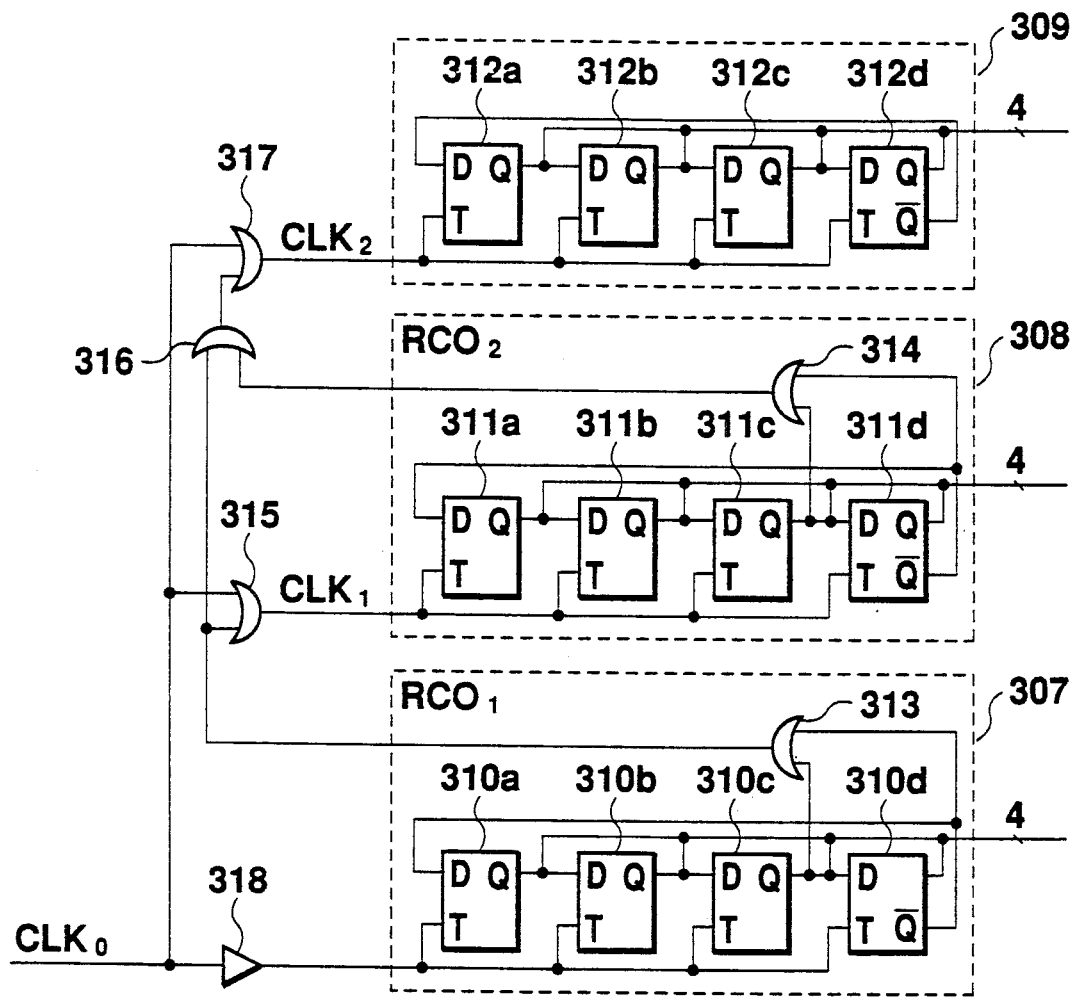
FIG. 16 is a block diagram of a third embodiment of present invention.
Figure 17:
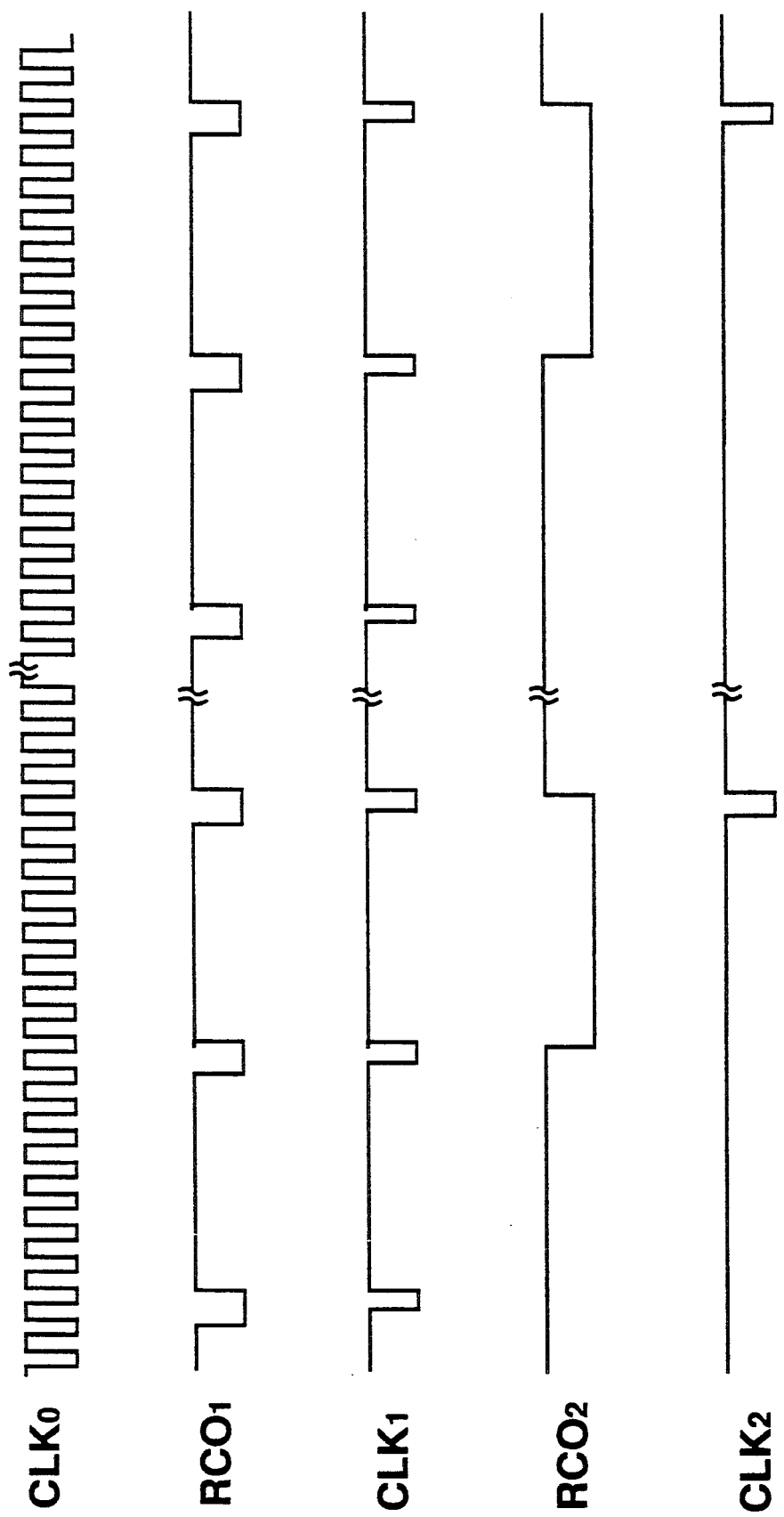
FIG. 17 is a timing chart of the operation of the third embodiment shown in FIG. 16.

FIG. 16 is a block diagram of the structure of a low-noise counter according to the present invention which is composed of 4-bit Johnson counters connected in three stages, and FIG. 17 is a timing chart of the operation thereof.

Each of the 4-bit Johnson counters 307, 308 and 309 is composed of four flip-flops 310a to 310d (311a to 311d or 312a to 312d) which are connected in series. The inverted output $\overline{Q}$ of the flip-flop at the final stage 310d (311d or 312d) is supplied to the input T of the corresponding flip-flop 310a (311a or 312a) at the first stage. The OR's 313 and 314 of the outputs Q of the flip-flops 310c and 311c at the third stage and the inverted outputs $\overline{Q}$ of flip-flops 310d and 311d at the final stage of the Johnson counters 307 and 308, respectively, are output as carrying signals $RCO_1$ and $RC0_2$, respectively. These carrying signals $RCO_1$ and $RC0_2$ control the counting operations of the Johnson counters 308 and 309 at the next stages. The OR 315 of the carrying signal $RCO_1$ and a reference clock $CLK_0$ is supplied to the timing inputs T of the flip-flops 311a to 311d of the Johnson counter 308. The OR 316 of the carrying signals $RCO_1$ and $RCO_2$ is obtained and the OR 317 of the OR 316 and the reference clock $CLK_0$ is supplied to the timing inputs T of the flip-flops 312a to 312d of the Johnson counter 309. To the timing inputs T of the flip-flops 310a to 310d of the Johnson counter 307, the reference clock $CLK_0$ is input through a buffer 318 which delays a signal in the same way as a logic gate in order to match the operation of the Johnson counter 308 with the operations of the other Johnson counters 308, 309.

The count value of a Johnson counter having a 4-bit structure, namely, the output of each flip-flop varies as shown in the following table.

| Count value | Number of turning points |
|---|---|
| 0000 | — |
| 1000 | 1 |
| 1100 | 1 |
| 1110 | 1 |
| 1111 | 1 |
| 0111 | 1 |
| 0011 | 1 |
| 0001 | 1 |
| 0000 | 1 |

In this way, the Johnson counters 307, 308 and 309 having a 4-bit structure operates with a period of 8 clocks, and the number of turning points is constantly 1. Therefore, the Johnson counters 307, 308 and 309 operate with a period of 8 clocks of the reference clock $CLK_0$, and the carrying signal $RCO_1$ is [L] in a one-clock period at intervals of 8 clocks, as shown in FIG. 17. It is therefore possible to obtain a clock $CLK_1$ which corresponds to the $CLK_0$ having $\frac{1}{8}$ of the frequency by obtaining the OR 315 of the carrying signal $RCO_1$ and the reference clock $CLK_0$.

The Johnson counter 308 which operates in accordance with the reference clock $CLK_1$ operates with a period of 8 clocks of the reference clock $CLK_1$, namely, 64 clocks of the reference clock $CLK_0$, and the carrying signal $RCO_2$ is [L] in a period of eight clocks at intervals of 64 clocks, as shown in FIG. 17. It is therefore possible to obtain a clock $CLK_2$ which corresponds to the $CLK_0$ having 1/64 of the frequency by obtaining the OR 316 of the carrying signals $RCO_2$ and $RCO_1$ and further the OR 317 of the OR 316 and the reference clock $CLK_0$. The Johnson counter 309 which operates in accordance with the clock $CLK_2$ operates with a period of 8 clocks of the clock $CLK_2$, namely, 512 clocks of the reference clock $CLK_0$.

By combining the outputs of the flip-flops 310a to 310d, 311a to 311d and 312a to 312d of the Johnson counters 307, 308 and 309, respectively, a counter value of 12 bits for counting 512 clocks is obtained. In this case, the number of turning points in each of the Johnson counters 307, 308 and 309 is constantly 1, so that even if all the Johnson counters 307, 308 and 309 are simultaneously operated by the carrying operation, the number of turning points is 3.

Figure 18:
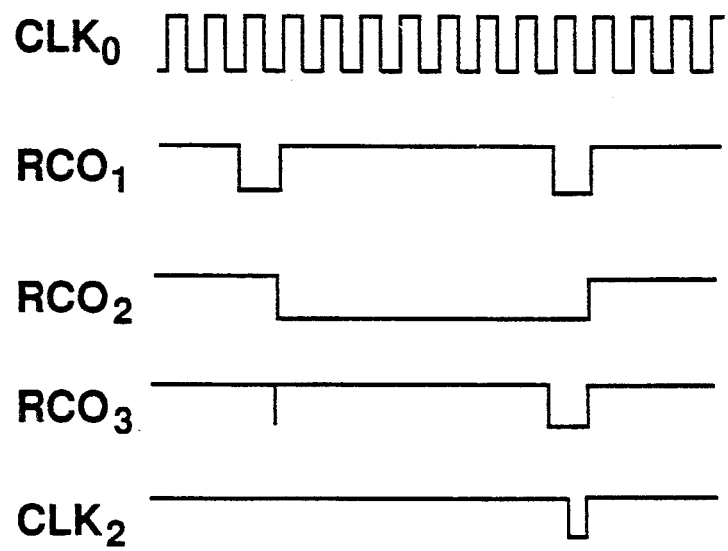
FIG. 18 shows the waveform of a carrying signal.

In the case of combining logic gates, if two inputs vary substantially simultaneously, spike noise is produced on the outputs. In the logic gates shown in FIG. 16, however, since the output of a logic gate which involves a fear of producing spike noise is not supplied directly to the Johnson counter 307, 308 or 309, the malfunction of the Johnson counter 307, 308 or 309 due to spike noise is prevented. To state this concretely, it is when the OR 316 of the carrying signals $RCO_1$ and $RCO_2$ is obtained that two inputs vary simultaneously. However, since the reference clock $CLK_0$ is [H] when the carrying signals $RCO_1$ and $RCO_2$ vary simultaneously, as shown in FIG. 18, even if spike noise is produced on a carrying signal $RCO_3$ which is obtained from the OR 316 of the carrying signals $RCO_1$ and $RCO_2$, the spike noise is eliminated by obtaining the OR 317 of the OR 316 and the reference clock $CLK_0$. Although spike noise produced on the carrying signal $RCO_3$ is shown at the timing of the leading edge of the reference clock $CLK_0$ in FIG. 18, since the carrying signal $RCO_3$ actually delays by the delay of the logic gate in relation to the reference clock $CLK_0$, the reference clock $CLK_0$ is [H] at the timing at which the spike noise is produced.

Figure 19:
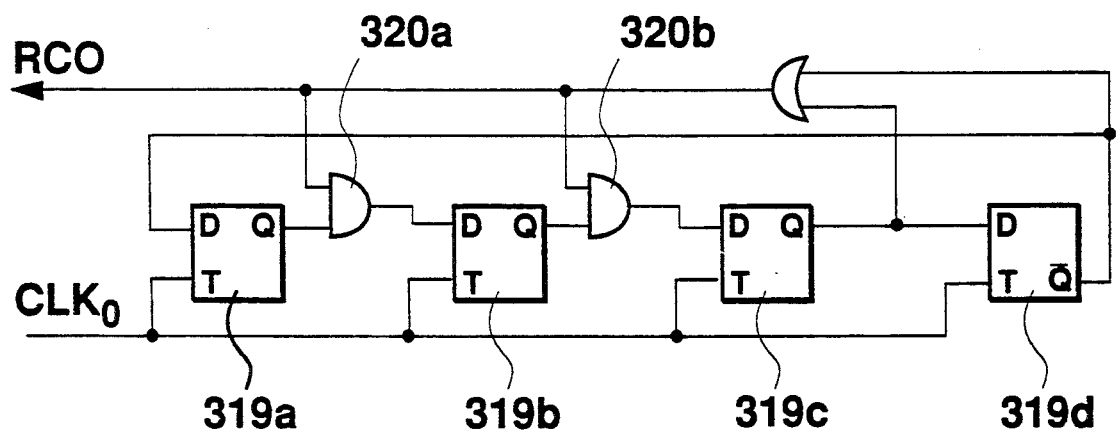
FIG. 19 is a block diagram of the structure of a presetting circuit.

Unless the outputs of the flip-flops 310a to 310d, 311a to 311d and 312a to 312d of the Johnson counters 307, 308 and 309, respectively, are in the same lever when the power is applied, it is impossible to set the number of turning points constantly at 1. For this reason, a preset circuit such as that shown in FIG. 19 is provided in order to set all the outputs of flip-flops 319a to 319d at [L]. If the outputs Q of the flip-flops 319a and 319b at the first and second stages are supplied to the inputs D of the flip-flops 319b and 319c, respectively, at the subsequent stages in the form of AND's 320a and 320b, respectively, of the outputs Q and a carrying signal RCO, when the Johnson counter outputs the carrying signal RCO (the carrying signal RCO becomes [L]), each of the AND's 320a and 320b also becomes [L] and [L] is set in the flip-flops 319b and 319c. When the carrying signal RCO is [L], the inverted output of the flip-flop 319d is naturally [L], and [L] is also set in the flip-flop 319a at the first stage. Consequently, the output of each of the flip-flops 319a to 319d becomes [L].

Fourth Embodiment

A fourth embodiment of the present invention will now be explained with reference to FIGS. 20 and 21.

Figure 20:
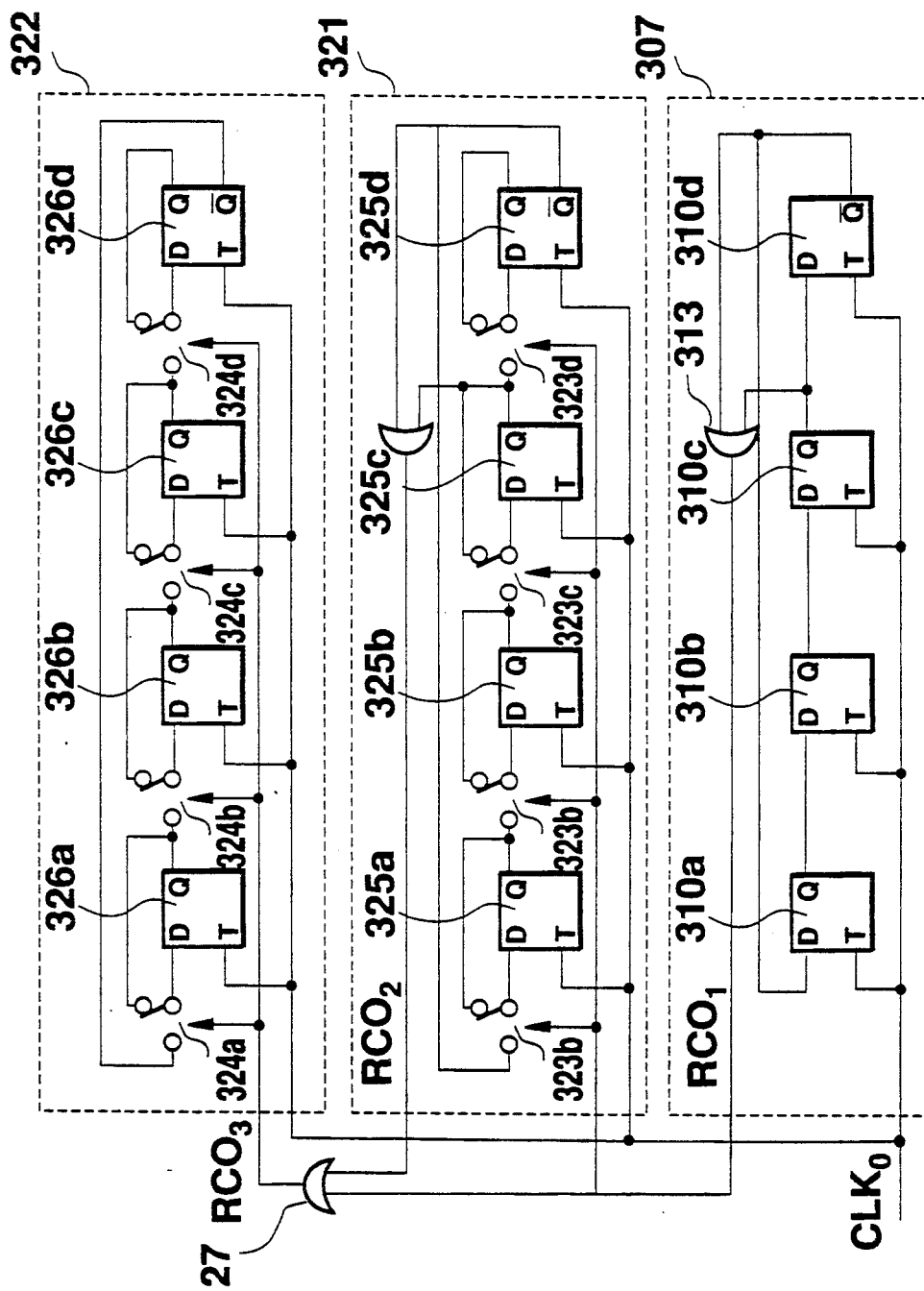
FIG. 20 shows a fourth embodiment of the present invention.
Figure 21:
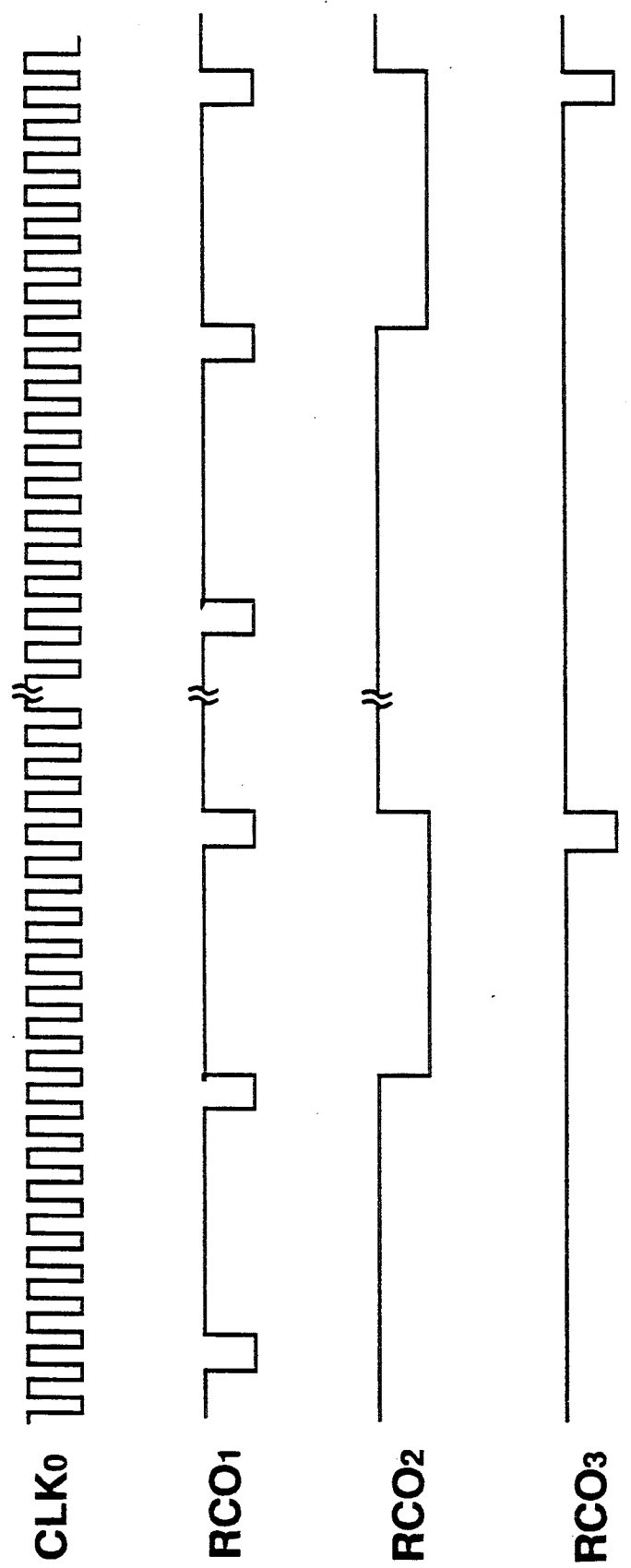
FIG. 21 is a timing chart of the operation of the fourth embodiment shown in FIG. 20.

FIG. 20 is a block diagram of the structure of another example of a low-noise counter which is composed of 4-bit Johnson counters connected in three stages like the third embodiment shown in FIG. 16, and FIG. 21 is a timing chart of the operation thereof.

The Johnson counter 307 at the first stage has the same structure as the Johnson counter shown in FIG. 16, and the same reference numerals are provided for the elements which are the same as those in FIG. 16. Johnson counters 321 and 322 at the second and the third stages are composed of flip-flops 325a to 325d, and 326a to 326d, respectively, connected in series through switches 323a to 323d and 324a to 324d, respectively, which are operated in accordance with a carrying signal. The inverted output of the flip-flops 325d, 326d at the final stage are connected to the inputs D of the flip-flops 325a and 326a, respectively, at the first stage. Each of the switches 323a to 323d and 324a to 324d selects the output Q of the corresponding flip-flop 325a to 325d, 326a to 326d or the output Q of the flip-flop at the precedent stage (the inverted output $\overline{Q}$ of the flip-flop 325d, 326d at the final stage in the case of the flip-flop 325a, 326a at the first stage) and supplies the selected output to the input D of the corresponding flip-flop. When later-described carrying signals $RCO_1$ and $RCO_3$ are [H], each of the switches 323a to 323d and 324a to 324d selects the output Q of the corresponding flip-flop 325a to 325d, 326a to 326d. On the other hand, when the carrying signals $RCO_1$ and $RCO_3$ are [L], each switch selects the output Q of the flip-flop at the precedent stage. Consequently, when the carrying signals $RCO_1$ and $RCO_3$ are [L], the flip-flops 325a to 325d, and 326a to 326d are connected in series.

A common reference clock $CLK_0$ is supplied to the flip-flops 310a to 310d, 325a to 325d and 326a to 326d of the Johnson counters 307, 321 and 322, respectively, so as to synchronize the operations of 310a to 310d, 325a to 325d and 326a to 326d. The carrying signal $RCO_1$ supplied from the Johnson counter 307 which operates with a period of 8 clocks of the reference clock $CLK_0$ becomes [L] in a one-clock period at intervals of 8 clocks and the carrying signal $RCO_1$ is supplied to the switches 323a to 323d of the Johnson counter 321. In the Johnson counter 321, therefore, the flip-flops 325a to 325d are connected in series in a one-clock period at intervals of 8 clocks of the reference clock $CLK_0$, and the data of each of the flip-flops 325a to 325d is shifted by 1 bit at intervals of 8 clocks. Similarly, the carrying signal $RCO_2$ output from the Johnson counter 321 which becomes L in an 8-clock period at intervals of 64 clocks of the reference clock $CLK_0$ is supplied to the switches 324a to 324d of the Johnson counter 322 in the form of the carrying signal $RCO_3$ which is obtained from the OR 327 of the $RCO_2$ and $RCO_2$. The carrying signal $RCO_3$ becomes L in a one-clock period at intervals of 64 clocks of the reference clock $CLK_0$ and the data of each of the flip-flops 326a to 326d in the Johnson counter 322 is shifted by 1 bit at intervals of 64 clocks. Consequently, the Johnson counter 322 operates with a period of 512 clocks of the reference clock $CLK_0$.

By combining the outputs Q of the flip-flops 310a to 310d, 325a to 325d and 326a to 326d, a counter value of 12 bits for counting 512 clocks is obtained in the same way as in FIG. 16.

In the third and fourth embodiment, Johnson counters having a 4-bit structure are cited as an example, but the number of bits, the stages for connecting the counters may be changed as occasion demands. If the number of bits of a Johnson counter is increased, although the circuit scale is enlarged, the number of edges is not increased, thereby increasing the number of countable clocks. On the other hand, if the number of stages for connecting the counters is increased, although the number of turning points is increased, the circuit scale is reduced.

Figure 22:
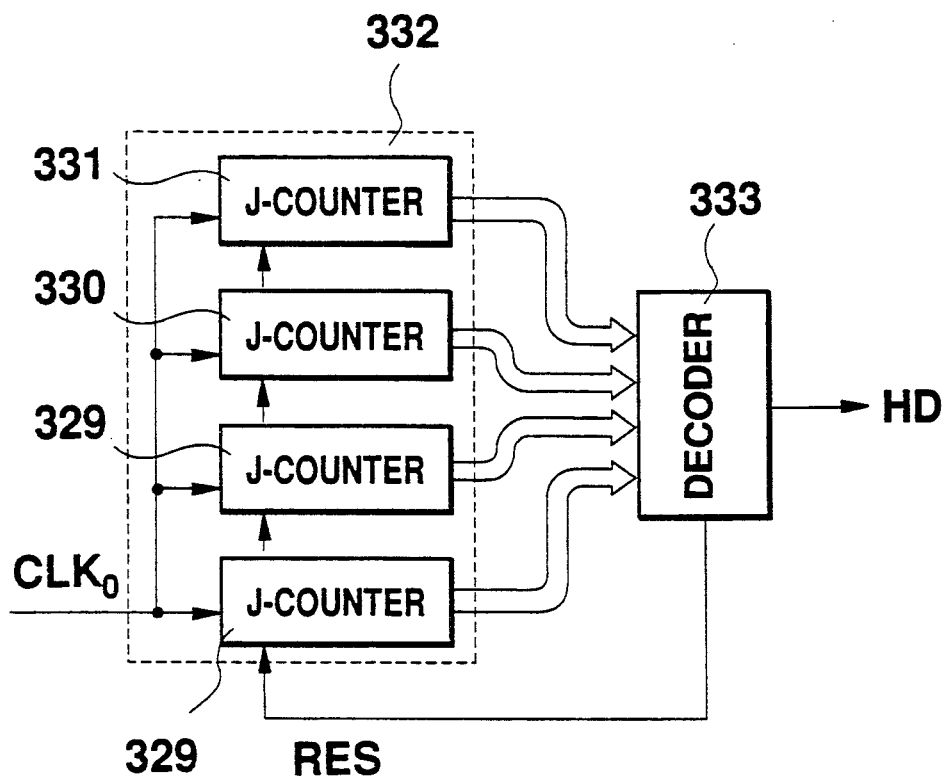
FIG. 22 is a block diagram of a circuit of a synchronizing system which adopts a low-noise counter according to the present invention.

FIG. 22 is a block diagram of a circuit of a synchronizing system which adopts a low-noise counter shown in FIG. 16 or in FIG. 20.

A counter 332 is composed of a combination of four Johnson counters 328 to 331. The output of each of the Johnson counters 328 to 331, in particular, the output of each of the flip-flops which constitute each of the Johnson counters 328 to 331 is input to a decoder 333. In the case of a TV camera corresponding to an NTSC system, since it is necessary to count 910 clocks having a frequency of 14.32 MHz, it is necessary to connect the four counters 328 to 331 having a 4-bit structure. However, since the Johnson counter 331 at the fourth stage can count 1024 clocks by 1 bit, it is not always necessary that the Johnson counter 331 has a 4-bit structure.

The decoder 333, which receives the output of the counter 332, generates various synchronous signals which are represented by the horizontal scanning signal HD and the reset signal RES for resetting the counter 332 with a period of 1H. Consequently, each Johnson counter is reset at intervals of 1H, and the counter 332 operates with a period of 910 clocks in the NTSC system and 908 clocks in the PAL system, whereby the counter value is supplied to the decoder 333 with a predetermined H period.

Figure 23:
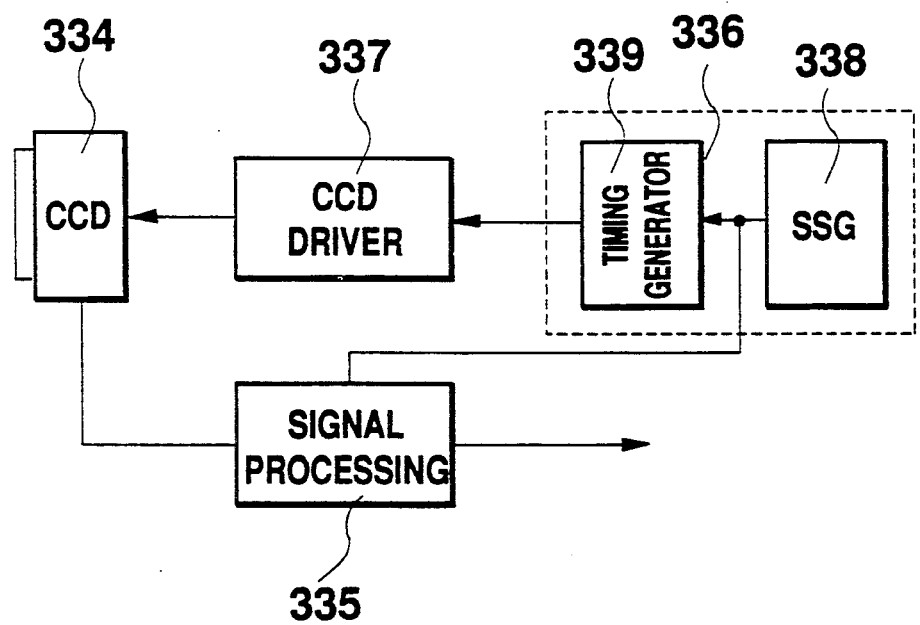
FIG. 23 is a block diagram of an image pickup device in accordance with the present invention.

FIG. 23 is a block diagram of the structure of an image pickup device in accordance with the present invention.

A CCD solid-state image sensor 334 stores information charges which correspond to the received image pattern, and outputs serial video signals for the respective screens. The video signal is subjected to various signal processings such as sample holding and gamma correction by a signal processor 335 and thereafter output to an external circuit.

A driving clock produced by a driving circuit 336 is supplied to the CCD 334 through a CCD driver 337 so as to drive the CCD 334 by pulses. The CCD driver 337 is provided so as to obtain a potential which enables the driving of the CCD 334. The CCD 334 is operated in accordance with the driving circuit 336 mainly for the purpose of boosting. The driving circuit 336 is composed of a synchronous signal generator 338 for generating a vertical synchronous signal and a horizontal synchronous signal, and a timing generator 339 for generating the timing for driving the CCD 334. These circuits 338 and 339 are constituted by a single integrated circuit. Various synchronous signals produced from the synchronous signal generator 338 are also supplied to the signal processor 335 and the CCD 334 is synchronized with the signal processor 335. The synchronous signal generator 338 is provided therein with the counter 332 and the decoder 333 such as those shown in FIG. 22. Power source noise superimposed on the driving clock due to the operation of the counter is greatly reduced even if the synchronous signal generator 338 and the timing generator 339 are constituted by a single integrated circuit.

As a result, the periodic noise superimposed on the video output from the CCD 334 is greatly reduced, so that no unnecessary fringes are produced on the reproduced picture, thereby preventing the deterioration of the picture quality.

If a low-noise counter according to the present invention is adopted not only on the video signal transmission side, namely, by a TV camera but also on the reception side, it is possible to reduce the power source noise caused by the counting operation.

What is claimed is:

1. A synchronizing circuit which receives a composite synchronous signal including both a vertical synchronous component having a vertical scanning period and a horizontal synchronous component having a horizontal scanning period and generates a horizontal synchronous signal and a vertical synchronous signal, said synchronizing circuit comprising:
   an edge detector for detecting an edge of said composite synchronous signal and outputting a pulse signal at every edge;
   a half killer circuit for eliminating an output pulse having a shorter period than a predetermined period from the output pulse of said edge detector and outputting said horizontal synchronous signal;
   a vertical synchronous signal separator for detecting the state of said composite synchronous signal in the vicinity of said edge and outputting said vertical synchronous signal;
   a counter which is reset by said vertical synchronous signal generated by said vertical synchronous signal separator and counts in synchronism with said horizontal synchronous signal;
   a blanking period detector for detecting the blanking period of vertical scanning operation by decoding the count value of said counter; and
   a control means for controlling said half killer circuit to operate only during said blanking period;
   a counter for counting a predetermined number of reference clock pulses; and
   gate means for stopping output pulse from said edge detector at predetermined intervals on the basis of a count value of said counter of said half killer circuit.

2. A synchronizing circuit according to claim 1, wherein said gate means includes:
   a decoder for decoding said count value of said counter of said half killer circuit and outputting a decode signal having a repetitive pattern with a different phase from said horizontal synchronous signal; and
   a gate for controlling passage of said output pulse of said edge detector in accordance with said decode signal.

3. A synchronizing circuit according to claim 2, further comprising a latch circuit for latching said decode signal with said vertical synchronous signal as a trigger such that a field of said composite synchronous signal is identified by data in said latch circuit.

4. A synchronizing circuit which receives a composite synchronous signal including both a vertical synchronous component having a vertical scanning period and a horizontal synchronous component having a horizontal scanning period and generates a horizontal synchronous signal and a vertical synchronous signal, said synchronizing circuit comprising:
   a counter for counting a predetermined number of reference clock pulses;
   a decoding circuit for generating a time-sharing signal including a plurality of pulses in one horizontal scanning period in accordance with a count value of said counter;
   an edge detector for detecting an edge of said composite synchronous signal and outputting a phase signal at every edge;
   a half killer circuit to which a signal having a period equal to that of the output of said edge detector and said time-sharing signal are applied and which stops the output of said edge detector for a predetermined time determined by a time-sharing pulse occurring after an output pulse of said edge detector so as to eliminate an output pulse having a period shorter than said horizontal scanning period and to output said horizontal synchronous signal; and
   a vertical synchronous signal separator for detecting a binary state of said composite synchronous signal adjacent said edge and outputting said vertical synchronous signal.

5. A synchronizing circuit according to claim 4, wherein said decoding circuit includes:
   a decoder for decoding the count value of said counter and outputting a plurality of signals having different phases from each other, each of said signals having a pulse at intervals of one horizontal scanning period; and
   a gate for compounding said plurality of signals output from said decoder to generate said time-sharing signal having a plurality of pulses in one horizontal scanning period.

6. A synchronizing circuit according to claim 5, further comprising means for determining a difference in phase between said horizontal synchronous signal which is separated from said composite synchronous signal and one of said plurality of signals output from said decoder of said decoding circuit so as to adjust the period of said reference clock in accordance therewith so as to synchronize operation of said decoding circuit with said composite synchronous signal.

7. A synchronizing circuit according to claim 4, wherein said half killer circuit includes:

a shift register which changes states when a pulse of time-sharing signal occurs after a pulse of said signal having a period equal to that of the output of said edge detector; and a decoder for outputting a half killer pulse which indicates that said shift register is in a predetermined state.

8. A synchronizing circuit according to claim 4, wherein said signal having the same period as the output of said edge detector is an output signal of said edge detector which is delayed by a time shorter than said horizontal scanning period.

* * * * *